United States Patent
Criniere et al.

(10) Patent No.: US 10,851,017 B2
(45) Date of Patent: *Dec. 1, 2020

(54) THERMALLY TREATED BRIQUETTES CONTAINING A "QUICK" CALCIUM-MAGNESIUM COMPOUND AND CALCIUM FERRITES, AND METHOD OF MANUFACTURE THEREOF

(71) Applicant: S. A. Lhoist Recherche et Developpement, Ottignies-Louvain-la-Neuve (BE)

(72) Inventors: Guillaume Criniere, Braine-l'Alleud (BE); Michael Nispel, Louvain-la-Neuve (BE)

(73) Assignee: S. A. Lhoist Recherche et Developpement, Ottignies-Louvain-la- (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/308,293

(22) PCT Filed: Jul. 7, 2017

(86) PCT No.: PCT/EP2017/067135
§ 371 (c)(1),
(2) Date: Jul. 15, 2019

(87) PCT Pub. No.: WO2018/007607
PCT Pub. Date: Jan. 11, 2018

(65) Prior Publication Data
US 2019/0337846 A1  Nov. 7, 2019

(30) Foreign Application Priority Data
Jul. 8, 2016 (BE) .................................. 2016/5575

(51) Int. Cl.
*C04B 18/02* (2006.01)
*C04B 22/06* (2006.01)
(Continued)

(52) U.S. Cl.
CPC .......... *C04B 18/021* (2013.01); *C04B 14/308* (2013.01); *C04B 22/064* (2013.01);
(Continued)

(58) Field of Classification Search
CPC ... C04B 18/021; C04B 22/066; C04B 14/308; C04B 22/064; C04B 2111/00732;
(Continued)

(56) References Cited

U.S. PATENT DOCUMENTS 1,994,378 A * 3/1935 Williams .................. C22B 1/24
75/322
3,645,719 A 2/1972 Minnick
(Continued)

FOREIGN PATENT DOCUMENTS

EP 2199417 B1 10/2011
EP 3042965 A1 7/2016
(Continued)

OTHER PUBLICATIONS

Barnett, Thomas P., "Roll-Press Briquetting: Compacting Fines to Reduce Waste Handling Costs", Article, 5 pages, copyright Powder and Bulk Engineering, CSC Publishing, Inc.
(Continued)

*Primary Examiner* — Jessee R Roe
*Assistant Examiner* — Rebecca Janssen
(74) *Attorney, Agent, or Firm* — Whitaker Chalk Swindle & Schwartz PLLC; Charles Gunter

(57) ABSTRACT

Composition in the form of green or thermally treated briquettes comprising at least one "quick" calcium-magne-
(Continued)

Example 2   Example 3   Example 4   Exemple 5

Exemple 6   Exemple 7   Exemple 8   Exemple 9 sium compound and an iron-based compound, the method of production thereof and uses thereof.

13 Claims, 5 Drawing Sheets

(51) Int. Cl.
*C22B 1/243* (2006.01)
*C22B 1/245* (2006.01)
*C04B 14/30* (2006.01)
*C04B 111/00* (2006.01)

(52) U.S. Cl.
CPC ............ *C04B 22/066* (2013.01); *C22B 1/243* (2013.01); *C22B 1/245* (2013.01); *C04B 2111/0087* (2013.01); *C04B 2111/00732* (2013.01); *C04B 2111/00758* (2013.01); *C04B 2111/00887* (2013.01)

(58) Field of Classification Search
CPC . C04B 2111/00758; C04B 2111/00887; C22B 1/245; C22B 1/243
See application file for complete search history.

(56) References Cited

U.S. PATENT DOCUMENTS

| | | | | |
|---|---|---|---|---|
| 3,649,248 | A * | 3/1972 | Ishimitsu | C21C 5/36 75/323 |
| 5,186,742 | A | 2/1993 | Hoffman et al. | |
| 2016/0115076 | A1* | 4/2016 | Criniere | C01F 5/02 106/457 |
| 2018/0021980 | A1* | 1/2018 | Criniere | C22B 1/16 252/88.1 |

FOREIGN PATENT DOCUMENTS

| | | | |
|---|---|---|---|
| FR | 3008405 A1 | * | 1/2015 |
| JP | H0598359 A | * | 8/1991 |
| JP | 1993-H0598359 A | | 4/1993 |
| JP | 1999-H11209817 A | | 8/1999 |
| JP | 2007169707 A | | 7/2007 |
| JP | 2013087350 A | | 5/2013 |
| KR | 101008694 | | 1/2011 |
| WO | 03012154 A1 | | 2/2003 |
| WO | 201507661 A1 | | 1/2015 |
| WO | WO2015007661 | * | 1/2015 |

OTHER PUBLICATIONS vol. 24, No. 10., "Taking the Heat Out of Grinding", Article; 4 pages, Oct. 2010, copyright Powder and Bulk Engineering, CSC Publishing, Inc. www.powderbulk.com/wp-content/uploads/pdf/pbe_2010110_058.pdf.

Garcia, E.A.S., et el. , "Pelotizacao De Finos De Clacario Utilzando Agua E Cal Virgem Como Agentes Aglomerantes", XXVI Encontro Nacional De Tratamento De Minerios E Metalurgia Extrativa, vol. 1, 2015, 9 pages.

PCT/EP2017/067135 International Search Report, 4 pages, dated Sep. 21, 2017.

S. Ghasemi Kahrizsangi et al.,"The Effect of Nano-Additives on the Hydration Resistance of Materials Synthesized From the MgO—CaO System", Article, pp. 539-545, International Journal of Engineering, vol. 29, No. 4, Apr. 2016.

Wendong Zue, et al; "Effect of Fe2O3 on the Sintering Property of MgO—CaO Refractory"; Article; 5 pages; Advanced Materials Research vols. 233-235; Trans Tech Publications, Switzerland; copyright 2011 10.4028/www.scientific.net/AMR.233-235.2395.

* cited by examiner

THERMALLY TREATED BRIQUETTES CONTAINING A "QUICK" CALCIUM-MAGNESIUM COMPOUND AND CALCIUM FERRITES, AND METHOD OF MANUFACTURE THEREOF

The present invention relates to a composition in the form of thermally treated briquettes containing a "quick" calcium-magnesium compound and calcium ferrites, to the method of manufacture thereof, and to the use thereof.

The term "quick" calcium-magnesium compound means, in the sense of the present invention, a solid mineral material whose chemical composition is mainly calcium oxide and/or magnesium oxide. The "quick" calcium-magnesium compounds in the sense of the present invention therefore comprise quicklime (calcium lime), magnesium quicklime, dolomitic quicklime or "quick" calcined dolomite. The "quick" calcium-magnesium compounds contain impurities, namely compounds such as silica, $SiO_2$, or alumina, $Al_2O_3$, etc., at a level of a few percent. It is to be understood that these impurities are expressed in the aforementioned forms but may in reality appear as different phases, it also generally contains a few percent of residual $CaCO_3$ or $MgCO_3$, called underburned, and a few percent of residual $Ca(OH)_2$ or $Mg(OH)_2$, owing to partial hydration of the "quick" products during the steps of cooling, handling and/or storage.

Quicklime means a solid mineral material, whose chemical composition is mainly calcium oxide, CaO. Quicklime is commonly obtained by calcination of limestone, mainly consisting of $CaCO_3$. Quicklime contains impurities, namely compounds such as magnesium oxide MgO, silica $SiO_2$, or alumina $Al_2O_3$, etc., at a level of a few percent. It is to be understood that these impurities are expressed in the aforementioned forms but may in reality appear as different phases. It also generally contains a few percent of residual $CaCO_3$, called underburned, and a few percent of residual $Ca(OH)_2$, owing to partial hydration of the calcium oxide CaO during the steps of cooling, handling and/or storage.

According to the present invention, the term "briquette" means a compact of oblong shape, weighing about 5 to 100 g per briquette, inscribed in a flattened or elongated ellipsoid of revolution ("oblate ellipsoid of revolution" or "prolate ellipsoid of revolution"). Typically, briquettes have the shape of a bar of soap or are described as "egg briquettes".

These contrast with pellets, which are typically in the form of tablets, such as those produced with the "Titan" presses from the company "Eurotab". By definition, pellets for industrial use are of regular shape, more particularly in the form of a cylinder with a small height.

Briquettes are known from the prior art, see for example document WO2015007661. According to this document, compacts (i.e. briquettes or pellets) are described comprising particles of calcium-magnesium compound comprising at least 50% of "quick" calcium-magnesium compound. The compacts (in the form of briquettes or pellets) disclosed may also contain additives, in particular iron oxide.

According to that document, drop strength is measured in a shatter test. The compacts described generally have a shatter index below 10%.

The term "shatter index" means, in the sense of the present invention, the percentage by weight of fines under 10 mm generated after 4 drops from 2 m starting from 10 kg of product. These fines are quantified by sieving through a screen with square mesh of 10 mm after 4 drops from 2 m.

A detailed analysis of the examples and counter-examples of that document shows that raw pellets having an improved drop strength were obtained using at least 50% of "quick" products, and that these pellets also display resistance to ageing in humid atmosphere. In contrast, when briquettes of "quick" compounds are obtained using "quick" compounds, the shatter index, representing the mechanical strength, remains high (between 13 and 15%) and it is necessary to carry out a thermal treatment if we wish to reach a shatter index below 10%.

Document U.S. Pat. No. 5,186,742 discloses lime briquettes containing from 55 to 85 wt % of lime, from 10 to 40 wt % of ash and from 0.1 to 10 wt % of paper fibres as well as optionally a lubricant. The briquettes disclosed in document U.S. Pat. No. 5,186,742 were tested for their drop strength, a test that is not comparable to the test for measuring the shatter index, and they have a compressive strength between 150 and 300 pounds, which corresponds to a shatter index well above 10%.

Calcium-magnesium compounds are used in many industries, for example iron and steel metallurgy, treatment of gases, treatment of water and sludge, agriculture, the building industry, public works etc. They may be used either in the form of pebbles or lumps, or in the form of fines (generally smaller than 7 mm). However, the pebble form is preferred in certain industries.

This is the case, for example, in the iron and steel industry, when adding calcium and magnesium compounds to oxygen converters or arc furnaces.

During production of these pebbles and lumps, a large amount of fines is generated. These fines typically have limited potential for use as they are difficult to transport and handle.

For some years it has been the aim in a number of sectors to transform compounds initially in the form of powder into briquettes for easier and safer transport, handling and use.

Lime burners always maintain a balance of materials between the calcium-magnesium compounds in pebble form and the fines generated before and during calcination as well as during handling and subsequent operations. Nevertheless, an excess of fines is produced in certain cases. These fines may then be agglomerated together in the form of briquettes or the like, which not only makes it possible to remove the excess fines but also to increase the production of calcium and magnesium compounds in pebble form artificially by adding these briquettes or the like to the pebbles.

The work by Barnett et al. (Roll-press briquetting: Compacting fines to reduce waste-handling costs. Powder and Bulk Engineering, Vol. 24, No. 10, October 2010, 1-6) describes a method for manufacturing raw lime briquettes. However, this document is silent regarding the production conditions as well as regarding the mechanical properties of the briquettes obtained. Briquettes based on excess fines or the like generally have tower mechanical strength than the calcium and magnesium compounds in pebble form. Their resistance to ageing during storage or handling is also well below that of the calcium and magnesium compounds in pebble form.

This explains why, in practice, briquetting of fines of calcium and magnesium compounds is not much used at present. Taking into account the low quality of the briquettes formed by this type of process, it is estimated that briquetting provides a yield below 50%, owing to the presence of a very large number of unusable briquettes at the end of this type of process, which requires a recycling step.

Lubricants and binders are additives that, are often used in methods of agglomeration in the form of briquettes or similar.

Lubricants may be of two types, internal or external, internal lubricants are mixed intimately with the materials to be briquetted. They promote on the one hand the flowability of the mixture during feed of the briquetting machine and on the other hand rearrangement of the particles within the mixture during compression. External lubricants are applied on the surfaces of the rollers of the briquetting machine and mainly aid mould release, in both cases they reduce friction on the surface and therefore wear. The lubricants may be liquids such as mineral oils, silicones, etc., or solids such as talc, graphite, paraffins, stearates, etc. In the case of compositions based on "quick" calcium-magnesium compounds, stearates are preferred, and more particularly calcium stearate or magnesium stearate.

Binders are substances having the property of agglomerating the particles together, either by farces of adhesion, or by a chemical reaction. They may be of mineral origin (cements, days, silicates, etc.), of vegetable or animal origin (celluloses, starches, gums, alginates, pectin, glues, etc.), of synthetic origin (polymers, waxes, etc.). In many cases they are used together with water, which activates their agglomeration properties.

Over the years, several of these additives have been used for increasing the strength and durability of the briquettes or similar of calcium and magnesium compounds (calco-magnesium), for example calcium stearate or paper fibres (see for example U.S. Pat. No. 5,186,742), but without this giving sufficient improvement. Moreover, in a great many cases the use of the additives currently employed for other shaped industrial products is limited, as is the case notably for the manufacture of briquettes of calcium-magnesium compounds, either because the calcium-magnesium compounds react violently with water, or owing to a potentially negative effect of these additives on the end use of the briquettes of calcium-magnesium compounds.

In many refining processes in iron and steel metallurgy, a composition of "quick" calcium-magnesium compounds, such as quicklime and/or "quick" dolomite as well as scrap iron, are added to a converter to control the kinetics and chemistry of the slag forming reaction, thus facilitating removal of impurities and protecting the refractory lining of the furnace against excessive wear.

The "quick" calcium-magnesium compounds introduced float on the bath of hot metal, thus forming an interface.

During refining, molten metal is introduced into the vessel, to which scrap iron may also be added.

The molten metal resulting from the fusion of metal compounds has an initial carbon content typically from 40 to 45 kg per tonne of molten metal and an initial phosphorus content from 0.7 to 1.2 kg per tonne of molten metal.

The "quick" calcium-magnesium compounds are charged and float above the bath of molten metal. Oxygen is blown in for a predetermined period of time, in order to burn off the carbon and oxidize, directly and/or indirectly, the phosphorus-containing compounds, and silicon. During blowing, the calcium-magnesium compounds are immersed in the bath of molten metal and dissolve/melt slightly at the interface with the molten metal, the calcium-magnesium compounds always floating.

Slag is the layer of oxides floating on top of the bath and results from the formation of SiO due to oxidation of the silicon, from formation of other oxides (MnO and FeO) during blowing, from addition of "quick" calcium-magnesium compounds for neutralizing the action of $SiO_2$ on the refractory lining and for liquefying and activating the slag, and from MgO from wear of the refractory lining.

In fact, during conversion, a metal/gas reaction takes place, in which carbon is burned to form gaseous CO and $CO_2$. At the end of the predetermined blowing time, the carbon content is reduced to about 0.5 kg per tonne of molten metal, which is about 500 ppm.

At the interface between the molten metal and the floating calcium-magnesium compounds, a metal/slag reaction takes place, which is intended to remove phosphorus from the molten metal. At the end of the reaction between the slag and the metal, the phosphorus content is about 0.1 kg or less per tonne of molten metal, i.e. about 100 ppm or less.

If the metal is iron and the calcium-magnesium compound is calcium lime, the chemical reaction is as follows:

$$5FeO + 4CaO + 2P \rightleftharpoons 4CaO.P_2O_5 + 5Fe$$

The FeO (iron oxide) and the phosphorus are derived from the hot metal, whereas the CaO is added in the converter. This reaction is exothermic and the aim is to shift the equilibrium to the right-hand side. This may be achieved by lowering the temperature, fluidizing the slag as much as possible, homogenizing the metal bath (carried out by blowing argon and/or nitrogen from the bottom in most cases), maintaining the $CaO/SiO_2$ basicity index between 3 and 6 (the weight ratio of calcium oxide to silica, which is acidic), maintaining the level of magnesite at less than 9% in the slag, and creating sufficient quantities of slag.

Magnesite is typically present in the slag and is derived from wear of the refractory lining, which may be reduced by controlled addition of "quick" dolomite. However, to favour the kinetics of the reaction in the slag, the level of magnesite should be kept below 9%.

As will be understood, refining of the hot metal is not so easy, and it would need to be optimized to obtain a given amount of liquid metal, by action on the mass equilibrium of the metal, a given chemical analysis, by action on the mass equilibrium of oxygen (oxidation reaction), and a given temperature at the end of blowing (action on the thermal equilibrium).

The complexity of improving dephosphorization during refining of hot metal is due, among other things, to simultaneous observation of the three equilibria. Such a method for dephosphorization during refining is known in the prior art from the document "Process for dephosphorization of steel in Linz Donawitz converter (BOF converter) by pellet addition" (IN01412MU2006 A).

This patent focuses on improvement of dephosphorization during a process in a converter by cooling the slag in the second half of the process.

However, unfortunately the method disclosed requires an additional step in the method for introducing the rocks in the converter after charging the mineral additives and the standard heat-transfer medium. This consequently increases the process time, which is not an acceptable solution for the refining industry, since each second during such a refining process is very costly.

Another method for removing phosphorus is known from the document Slag-Making Methods and Materials, patent U.S. Pat. No. 3,772,999. This patent focuses on improving dephosphorization in the method using a converter, by using products based on lime in briquettes having 0.5 to 15% of $CaCl_2$, NaCl, KCl and/or $NaF_2$.

Moreover, addition, to lime, of fluxes such as iron oxides, manganese oxides, carbon, $CaF_2$, boron oxide, during the refining process, was found in the prior art to improve the quality of the refining process, for example for dephosphorization of molten metal.

However, addition of such fluxes typically creates additional complexity of the refining process.

There is therefore a need to supply "quick" calcium-magnesium compounds containing fluxes. In particular calcium ferrites in the form of monocalcium and/or dicalcium ferrites, as the latter contribute to slag formation.

Briquettes of "quick" calcium-magnesium compounds optionally containing fluxes are known. However, in the known calcium-magnesium compounds containing fluxes, an efflorescence effect has also been reported, which is problematic as blowing then entrains the efflorescence in the fumes (see U.S. Pat. No. 3,649,248). Moreover, it also appeared that when iron oxide is added, it must be converted to ferrite, which then plays a role in acceleration of slag formation.

However, although this seems simple on paper, the iron oxide converted to ferrite quite often remains negligible, and does not then perform its role in acceleration of slag formation, which leads steelmakers to add lime on the one hand, optionally with iron, and on the other hand ferrite, optionally with lime.

Formation of calcium ferrites requires relatively high temperatures (typically 1200-1250° C.) and quite long thermal treatment times (see also U.S. Pat. No. 3,649,248). The briquettes based on quicklime (dolomitic) and iron oxide described in the prior art therefore do not lead easily to the formation of calcium ferrites.

Thus, inclusion of said thermal treatment upstream of the converter has an adverse effect from the technical-economic standpoint (specific furnace, energy consumption, loss of production capacity, partial sintering, i.e. reduction of specific surface area and reduction of pore volume).

When the thermal treatment is carried out in-situ in the converter, the kinetics of formation of calcium ferrites is too slow and has an adverse effect on the performance of these briquettes for dephosphorization.

Consequently, there is not yet a product that is simple to use, not very restrictive, and that minimizes the loss of lime.

The present invention aims to solve these drawbacks, at least partly, by supplying a method allowing a considerable reduction in the loss of time and improvement of the efficacy of the lime in slag formation.

To solve this problem, a composition is envisaged according to the invention in the form of thermally treated briquettes, comprising a "quick" calcium-magnesium compound, preferably in the form of quicklime, and an iron-based compound in the form of calcium fertile, in which said calcium ferrite forms a matrix in which particles of "quick" calcium-magnesium compound are dispersed.

Said matrix is to be understood as being a continuous phase based on calcium ferrite, in which particles of "quick" calcium-magnesium compound, in particular quicklime, are dispersed. A distinction is made between the case when said particles of "quick" calcium-magnesium compound are of small size, so that they melt visibly in the matrix based on calcium ferrite, and the case when particles of "quick" calcium-magnesium compound are of larger size, appearing as inclusions of "quick" calcium-magnesium compound in said matrix.

The aforesaid distinction is made concrete on the basis of a section of a briquette according to the invention, applying scanning electron microscopy coupled to energy dispersive analysis. This provides visualization in two dimensions (the surface of the section) of an object initially in three dimensions (briquette), but also of the particles that make up the briquette. Thus, the particles of calcium-magnesium compound also appear in two dimensions on the section plane.

As it is customary to liken particles in three dimensions to spheres and determine their size as the diameter of the equivalent sphere ("three-dimensional" size), in the present invention the cut surface of the particle is likened to an equivalent disk and its "two-dimensional" size to the equivalent diameter of this disk. More precisely, the two-dimensional sizes are calculated with a program that finds, for each particle of "quick" calcium-magnesium compound dispersed in the continuous matrix of calcium ferrite, the sum of the smallest and the largest dimension of its cut surface divided by two. This sum divided by two represents the diameter of the equivalent disk.

In this acceptation, it is considered that the particles of "quick" calcium-magnesium compound melt or merge in said matrix (continuous phase) of calcium ferrite when said particles of "quick" calcium-magnesium compound have a two-dimensional size under 63 µm, observable by scanning electron microscopy coupled to energy dispersive analysis, in a section of the briquette.

It is considered, moreover, that inclusions of "quick" calcium-magnesium compound are present in the matrix based on calcium ferrite, when particles of "quick" calcium-magnesium compound having a two-dimensional size above 63 µm, but under 5 mm, observable by scanning electron microscopy coupled to energy dispersive analysis in a section of the briquette, cover at least 20% of the area of said section.

It is also considered that if particles of "quick" calcium-magnesium compound having a two-dimensional size above 63 µm but under 5 mm, observable by scanning electron microscopy coupled to energy dispersive analysis, are present in a section of the briquette but cover less than 20%, in particular less than 10% of the surface area of said section, true inclusions of "quick" calcium-magnesium compounds are not present, but rather some particles of "quick" calcium-magnesium compounds are present by chance, notably resulting from the imperfect nature of the manufacturing process, in particular the calcination, of the briquette.

Briquettes of calcium ferrites without significant presence of inclusions of "quick" calcium-magnesium compounds are therefore usable in iron and steel metallurgy, notably in a converter for refining molten metal, to facilitate slag formation. Such briquettes therefore clearly offer an advantage in accelerating the formation of slag and increasing its fluidity.

However, calcium ferrites themselves do not allow refining of molten metal, namely trapping its impurities. It is only the calcium-magnesium compound, in particular quicklime, that can provide this function. It is therefore possible to add for example quicklime as lumps or briquettes of quicklime simultaneously with the briquettes based on calcium ferrites according to the invention.

An advantageous alternative according to the invention is to provide inclusions of "quick" calcium-magnesium compounds, in particular of quicklime, dispersed in the continuous phase (matrix) of calcium ferrite, as described above. In fact, the "quick" calcium-magnesium compound is then available in situ at the place where the calcium ferrites have promoted slag formation, acting as flux to allow the "quick" calcium-magnesium compound to act immediately.

In one embodiment, said composition is therefore characterized in that said particles of "quick" calcium-magnesium compound have a two-dimensional size under 63 µm, observable by scanning electron microscopy coupled to energy dispersive analysis, in a section of said briquette.

In a preferred embodiment, said composition is characterized in that it further comprises particles of "quick" calcium-magnesium compound of two-dimensional size above 63 nm and under 5 mm, observable by scanning electron microscopy coupled to energy dispersive analysis, in a section of said briquette.

Advantageously, said composition is characterized in that it comprises said particles of "quick" calcium-magnesium compound of two-dimensional size above 63 μm and under 5 mm, observable by scanning electron microscopy coupled to energy dispersive analysis, in a section of said briquette and covering at least 20% of the area of said section.

Preferably, said composition is characterized in that it comprises said particles of "quick" calcium-magnesium compound of two-dimensional size above 63 μm and under 5 mm, observable by scanning electron microscopy coupled to energy dispersive analysis, in a section of said briquette and covering at most 60% of the surface area of said section of the briquette.

In another embodiment, said composition is characterized in that it comprises said particles of "quick" calcium-magnesium compound of two-dimensional size above 63 μm and under 5 mm, observable by scanning electron microscopy coupled to energy dispersive analysis, in a section of said briquette and covering less than 20%, preferably less than 10% of the surface area of said section.

Advantageously, said composition is characterized in that at least 70 wt %, preferably 80 wt %, more preferably 90 wt % of said iron-based compound is in the form of calcium ferrite.

In fact, there are substantially two possible phases of calcium ferrites: the monocalcium ferrites of formula $CaFe_2O_4$ and the dicalcium ferrites $Ca_2Fe_2O_5$. The former have the advantage of melting at a lower temperature, which potentially accentuates the role of flux when they are used. The latter have a higher melting point, which potentially allows easier manufacture but with thermal treatment that may be more costly in terms of energy.

Preferably, said composition is therefore characterized in that at least 40 wt %, preferably 50 wt % of said calcium ferrite is in the form of monocalcium ferrite $CaFe_2O_5$.

In an alternative embodiment, said composition is characterized in that at least 40 wt %, preferably 50 wt % of said calcium ferrite is in the form of dicalcium ferrite $Ca_2Fe_2O_5$.

Preferably, said composition is characterized in that it has a BET specific surface area greater than or equal to 0.4 m²/g, preferably greater than or equal to 0.6 m²/g, more preferably greater than or equal to 0.8 m²/g.

Advantageously, said composition is characterized in that it has a porosity of greater than or equal to 20%, preferably greater than or equal to 22%, more preferably greater than or equal to 24%.

The term "porosity of the composition in the form of briquettes" means, in the sense of the present invention, the total mercury pore volume determined by mercury intrusion porosimetry according to part 1 of standard ISO 15901-1: 200SE, which consists of dividing the difference between the skeletal density, measured at 30000 psia, and the apparent density, measured at 0.51 psia, by the skeletal density.

Alternatively, the porosity may also be measured by kerosene intrusion porosimetry. The density and porosity of the briquettes are determined by kerosene intrusion, according to a measurement protocol derived from standard EN ISO 5017. The measurements are carried out on 5 briquettes.

The density of the briquettes is calculated from the formula m1/(m3−m2)×Dp and the porosity as a percentage from the formula (m3−m1)/(m3−m2)×100.

m1 is the weight of these 5 briquettes, m2 is the weight of these 5 briquettes immersed in kerosene and m3 is the weight of these 5 "wet" briquettes, i.e. impregnated with kerosene. Dp is the density of the kerosene.

Preferably, said briquettes are characterized in that they have a shatter index below 10%, preferably below 8%, advantageously below 6%.

The term "shatter index" means, in the sense of the present invention, the percentage by weight of fines under 10 mm generated after 4 drops from 2 m starting from 10 kg of product. These fines are quantified by sieving through a screen with square mesh of 10 mm after 4 drops from 2 m.

The percentages by weight of CaO+MgO equivalent, but also of $Fe_2O_3$, are determined by X-ray fluorescence spectrometry (XRF) as described in standard EN 15309. Semi-quantitative chemical analysis by XRF for determining the relative concentration by weight of the elements whose atomic mass is between 16 (oxygen) and 228 (uranium) is carried out starting from samples ground to 80 μm and formed into pellets. The samples are introduced into PANalytical/MagiX Pro PW2540 apparatus, operating in wavelength dispersion mode. The measurement is performed with a power of 50 kV and 80 mA, with a Duplex detector.

The results of the analysis give the content of calcium, magnesium and iron and these measurements are reported as weight of CaO and MgO equivalent, and as weight of $Fe_2O_3$ equivalent.

The present invention also relates to a method for manufacturing thermally treated briquettes that comprises the following steps:

mixing particles of calcium magnesium compound, preferably in the form of particles of quicklime, with particles of an iron-based compound, preferably in the form of iron oxide, so as to obtain a pulverulent homogeneous mixture;

feeding a roller press with said pulverulent homogeneous mixture, compressing said pulverulent homogeneous mixture in said roller press, with obtaining a calcium-magnesium composition in the form of green briquettes, and characterized in that the rollers of said roller press developing linear speeds at the periphery of the rollers between 10 and 300 cm/s, preferably between 20 and 80 cm/s, and linear pressures between 60 and 160 kN/cm, preferably between 80 and 140 kN/cm, and even more preferably between 80 and 120 kN/cm, and in that said briquettes are thermally treated briquettes, the method further comprising a thermal treatment of said green briquettes at a temperature between 1050° C. and 1200° C. for a time between 5 and 25 minutes, preferably between 10 and 20 minutes, said mixing step is carried out with a fraction of particles of calcium-magnesium compound having at least 30 wt % of the particles ≤90 μm (therefore having a $d_{30}$≤90 μm), which comprises at least 20 wt % of CaO equivalent relative to the total weight of said pulverulent homogeneous mixture, and with at least 20 wt % of iron particles having a $d_{90}$ under 200 μm, preferably under 150 μm, more preferably under 130 μm and even more preferably under 100 μm.

According to the present invention, it was in fact found that in contrast to the known compositions, in the briquettes according to the present invention, on the one hand owing to the fact that the mixture formed is homogeneous, but on the other hand, also owing to the large amount of the iron-based compound present in the form of iron oxide, a large amount of iron oxide was converted to calcium ferrite, after thermal treatment, thus forming a continuous phase called a matrix in the specific conditions identified as being advantageous in the method according to the present invention.

However, albeit in the known compositions, the granutometry of the iron oxide was identified as being unsuitable, often being too large, and a person skilled in the art also knows that the use of fine powders in methods of forming by briquetting runs counter to good practice for a person skilled in the art since they degrade the flow properties of the mixture and therefore feeding of the presses.

The granulomere distribution of the iron-based compound used in the method is determined by laser granulometry. Measurement is therefore based on the diffraction of light and follows the theories of Fraunhofer and Mie.

Notably, it is assumed that the particles are spherical, non-porous and opaque. Measurement is performed according to standard ISO 13320 in methanol, without sonication.

Moreover, it was demonstrated according to the present invention that it is not only the granulometry that makes it possible to attain a sufficient degree of conversion after thermal treatment or in the converters, but rather that it is necessary for an iron oxide to be available that is fairly active when it is used with the "quick" calcium-magnesium compounds in the form of briquettes.

The terms an iron-based compound, an iron compound of very fine granulomere distribution, mean for example an iron-based compound, preferably based on iron oxide, characterized by a median size $d_{50}$ under 100 µm, preferably 50 µm as well as a size $d_{90}$ under 200 µm, preferably under 150 µm, preferably under 130 µm, more preferably under 100 µm.

The method according to the present invention Therefore makes it possible to obtain thermally treated briquette of calcium-magnesium compound whose mechanical strength is not impaired by adding fluxes, whose iron oxide has a very fine granulomere distribution characterized by a median size $d_{50}$ under 100 µm, preferably 50 µm as well as a size $d_{90}$ under 200 µm, preferably under 150 µm, preferably under 130 µm, more preferably under 100 µm, and which moreover is very flexible and gives good performance, without the aforesaid constraints.

In the sense of the present invention, said one iron based compound may be formed from one or more iron-based compounds, together having a total content in the composition of at least 20%, preferably at least 25%, more preferably at least 30%, preferably at least 35 wt %.

In the sense of the present invention, unless stated otherwise, the notation $d_x$ represents a diameter expressed in µm, measured by laser granulometry in methanol without sonication, relative to which x vol % of the particles measured are less than or equal. In the case of the "quick" calcium-magnesium compound, in particular quicklime, the method of measurement of the granulometry is by sieving and not by laser diffraction. Naturally the percentages are then expressed by weight.

In a particular embodiment, the method according to the present invention further comprises a thermal treatment of said green briquettes collected at a temperature between 900° C. and 1200° C., preferably between 1050° C. and 1200° C. inclusive, more preferably between 1100° C. and 1200° C. inclusive. The thermal treatment is preferably carried out for a predetermined time of between 3 and 20 minutes, preferably greater than or equal to 5 minutes and less than or equal to 15 minutes, thermally treated briquettes being formed and obtained, in which said iron oxide is converted to calcium ferrite, i.e. thermally treated briquettes comprising a "quick" calcium-magnesium compound and an iron-based compound comprising at least calcium ferrite.

When the thermal treatment is carried out in "multilayer" conditions, i.e. when the briquettes are in the form of a static bed of briquettes of a certain thickness, it will be understood that the thermal treatment time can be increased to allow time for the heat to penetrate to the centre of the bed of briquettes, in temperature conditions less than or equal to 1200° C., the temperature treatment makes it possible to obtain thermally treated briquettes comprising a calcium-magnesium compound and an iron-based compound containing calcium ferrite, whose porosity and specific surface area are little changed or unchanged, and whose mechanical strength is improved thereby, in other words, the phenomenon of sintering of the briquettes is avoided at these temperatures. These relatively high porosity characteristics allow rapid dissolution of the thermally treated briquettes in the slag in a metallurgical refining process.

Thus, it was observed that briquettes obtained by the method according to the present invention not only have a sufficiently high content of calcium ferrite, but the briquettes have particularly interesting mechanical strength represented by the shatter index.

In fact, in the method according to the present invention, the thermally treated briquettes have a shatter index below 8%, more particularly below 6%, preferably below 4%, more particularly below 3%, or even around 2%.

This means that according to the present invention, we have been able to produce very strong briquettes, whose loss due to broken briquettes or to the formation of fines during transport is reduced significantly and it is possible to overcome the drawbacks of the known briquettes, which quite often generate a loss even exceeding 20% of quicklime owing to the generation of fines during transport to the steelmaking shop and owing to handling and transport within the steelmaking shop.

Advantageously, the method according to the present invention comprises a step of recycling fines from said briquetting step and/or from said step of thermal treatment and from a step of introducing these fines in said mixing step.

In yet another variant according to the present invention, the method according to the present invention comprises a pre-treatment of the briquettes under modified atmosphere containing at least 2 vol % of $CO_2$ and at most 30%, in particular at most 20%, advantageously at most 15%, preferably at most 10 vol % of $CO_2$ relative to said modified atmosphere.

In yet another particularly advantageous embodiment, said "quick" calcium-magnesium compound is a soft-burned or medium-burned calcium-magnesium compound, preferably soft-burned.

In fact, in the method according to the present invention, it is advantageous if the calcium-magnesium compound supplied in the form of a homogeneous mixture is itself also sufficiently reactive, so as to form cohesive briquettes with the iron-based compound after thermal treatment. Moreover, for use in converters for forming slag, it is advantageous for the "quick" calcium-magnesium compound to be sufficiently reactive.

The "quick" calcium-magnesium compounds, like quicklime, are produced industrially by burning natural limestones in various types of kilns, such as shaft kilns (dual-flow regenerative kilns, annular kilns, standard shaft kilns, etc.) or else rotary kilns. The quality of the calcium-magnesium compound, such as quicklime for example, notably its reactivity with water, and the consistency of this quality, are partly linked to the type of kiln used, the operating conditions of the kiln, the nature of the limestone from which the "quick" calcium-magnesium compound is derived per se, or else the nature and the amount of fuel used. Thus, it is theoretically possible to produce a whole range of "quick" calcium-magnesium compounds, for example quicklime with reactivities with water ranging from the most explosive to the slowest.

Advantageously, said "quick" calcium-magnesium compound is quicklime.

In general, production of quicklime by mild baking (900-1000° C.) makes it possible to obtain rather reactive lime, whereas production of lime of low reactivity involves overburning at higher temperature (1200-1400° C.). Overburning quite often leads to the production of quicklime of less stable quality in terms of reactivity with water as the calcining operation is carried out in a thermal zone where the textural development of the quicklime is fairly sensitive. This overburned quicklime is moreover more expensive to produce than a milder quicklime as it requires the use of higher temperatures, but also because, unless dedicated kilns are used, production of this overburned quicklime leads to pauses in production campaigns to alternate with the production of mild quicklimes, which are more commonly used, which is not without problems in stabilization of the calcination conditions and therefore problems in stabilization of quality.

Quicklimes obtained by mild baking generally have specific surface areas measured by nitrogen adsorption manometry after vacuum degassing at 190° C. for at least 2 hours, calculated by the multiple-point BET method as described in standard ISO 9277:2010E, above 1 $m^2/g$ whereas the overburned quicklimes generally have surface areas well below 1 $m^2/g$.

In the context of this invention, the reactivity of quicklime is measured using the test of reactivity with water from European standard EN 459-2:2010 E. Thus, 150 g of quicklime is added with stirring in a cylindrical Dewar of 1.7 $dm^3$ capacity containing 600 $cm^3$ of deionized water at 20+ C. The quicklime is supplied in the form of lines with a size between 0 and 1 mm. Stirring at 250 revolutions per minute is carried out with a specific paddle. The temperature variation is measured as a function of time, making it possible to plot a curve of reactivity. The value of $t_{60}$, which is the time taken to reach 60° C., can be found from this curve.

The reactivity of burned dolomite is measured using this same reactivity test. In this case, 120 g of burned dolomite is added with stirring to a cylindrical Dewar of 1.7 $dm^3$ capacity containing 400 $cm^3$ of deionized water at 40° C. The burned dolomite is supplied in the form of fines with a see between 0 and 1 mm. Stirring at 250 revolutions per minute is carried out by means of a specific paddle. The temperature variation is measured as a function of time, making it possible to plot a curve of reactivity. The value of $t_{70}$, which is the time taken to reach 70° C., can be found from this curve.

The composition according to the present invention preferably comprises a soft-burned or medium-burned calcium-magnesium compound, preferably soft-burned, which is therefore necessarily relatively reactive, thus supplying reactive briquettes.

According to the present invention, a soft-burned or medium-burned calcium-magnesium compound, preferably soft-burned, is characterized by a value of $t_{60}$ below 10 min, preferably 8 min, preferably 6 min, and more preferably 4 min when the calcium-magnesium compound is a quicklime and by a value of $t_{70}$ below 10 min. preferably 8 min, preferably 6 min, and more preferably 4 min when the calcium-magnesium compound is a burned dolomite.

In a particular embodiment of the method according to the present invention, the method comprises, before said supplying of a homogeneous pulverulent mixture:
i. feeding a mixer with at least 40 wt % of a "quick" calcium-magnesium compound expressed in CaO+MgO equivalent relative to the weight of said composition and with at least 20%, preferably at least 25%, more preferably at least 30%, preferably at least 35 wt % of an iron-based compound expressed in $Fe_2O_3$ equivalent relative to the weight of said composition, said iron-based compound having a very fine granulomere distribution characterized by a median size $d_{50}$ under 100 µm, preferably 50 µm as well as a size $d_{90}$ under 200 µm, preferably under 150 µm, preferably under 130 µm, more preferably under 100 µm; and
ii. mixing said "quick" calcium-magnesium compound with said iron-based compound for a predetermined length of time, sufficient to obtain a homogeneous pulverulent mixture of said "quick" calcium-magnesium compound and of said iron-based compound.

More particularly, in the method according to the present invention, although a binder or lubricant may be added directly at the level of feeding the roller press, said binder or lubricant is added to the mixer, in which said binder or lubricant is included in said homogeneous pulverulent mixture.

In another particular embodiment of the method according to the present invention, said calcium-magnesium compound contains at least 10 wt % of quicklime in the form of ground particles relative to the weight of said composition.

Advantageously, said calcium-magnesium compound according to the present invention contains at least 40 wt %, preferably at least 50 wt %, preferably at least 60 wt %, particularly at least 65 wt %, in particular at least 70 wt %, preferably at least 80 wt %, advantageously at least 90 wt %, or even 100 wt % of quicklime in the form of ground particles relative to the weight of said composition.

"Quicklime in the form of ground particles" refers to the lime fines resulting from grinding quicklime and therefore corresponding to a size reduction of the limestone. Grinding may be carried out either starting from the ungraded material leaving the furnace and/or leaving the storage bin or starting from the ungraded material leaving the furnace and/or leaving the storage bin, screened beforehand. Grinding may be carried out using different types of grinding mills (impact crusher, hammer crusher, double roll crusher, cone crusher, etc.), either in open circuit (no recycling loop), or in closed circuit (recycling loop).

Quicklime in the form of ground particles (also called ground lime) differs from screened lime. Screened lime means the lime fines resulting from screening of lime. The granulometry is defined by the size of the screen. For example, a lime screened at 3 mm gives a 0-3 mm screened lime. Thus, screening of the ungraded material leaving the furnace leads to a "primary" screened lime. Screening of the ungraded material leaving the storage bin leads to a "secondary" screened lime.

In the sense of the present invention, quicklime in the form of ground panicles means lime fines generally containing more very fine particles than the lime fines from screening. Thus, if we consider for example 0-3 mm fines, quicklime fines in the form of ground particles will typically contain at least 30 wt %, most often at least 40 wt %, or even at least 50 wt % of very fine particles under 100 µm, whereas screened lime fines will often contain at most 25 wt %, or even at most 15 wt % of very fine particles under 100 µm.

The chemical composition of the fines of ground lime is generally more uniform than that of the screened lime fines. Thus, if we consider for example a 10-50 mm limestone calcined with an ash-generating fuel such as coal (lignite, hard coal, anthracite, etc.) or else petroleum coke, and characterize the 0-3 mm fines resulting from grinding or screening of this limestone, it will be found that the 0-200 µm fraction of the 0-3 mm fines resulting from grinding has a similar chemistry to that of the 200 µm-3 mm fraction, whereas the 0-200 µm fraction of the 0-3 mm fines resulting from screening contains more impurities than the 200 µm-3 mm fraction.

The lime fines from grinding are generally more reactive than the lime fines from screening. Thus, for soft-burned quicklime, if we measure the reactivity with water (standard EN459) of the 0-3 mm fines, the fines from grinding typically have values of too below 5 min whereas the fines from primary screening often have values of $t_{60}$ above 5 min.

In fact it was found, surprisingly, without it being possible at present to explain why, that addition of quicklime in the form of ground particles at a concentration of at least 10 wt % relative to the weight of the briquettes made it possible to obtain a greatly improved drop strength. A content as limited as 10 wt % makes it possible to obtain a significant improvement in mechanical strength, although the content of ground particles may be up to 100 wt %.

More particularly, said quicklime in the form of ground particles is a soft-burned or medium-burned quicklime, preferably soft-burned, said quicklime in the form of ground particles being characterized by a value of too below 10 min, preferably below 8 min, preferably below 6 min, and more preferably below 4 min.

Other embodiments of the method according to the invention are presented in the accompanying claims.

This mechanical strength, evaluated by the shatter test, for green briquettes having contents of iron-based compound below 40% is particularly interesting because these green briquettes may subsequently be treated thermally, according to one embodiment of the Invention, in a rotary kiln in which these briquettes are therefore submitted to repeated drops.

In the sense of the present invention, said "quick" calcium-magnesium compound comprises one or more "quick" calcium-magnesium compounds. The "quick" calcium-magnesium compound is selected from the group consisting of quicklime (calcium lime), magnesian lime, dolomite quicklime, calcined dolomite and mixtures thereof, preferably in the form of particles, such as panicles resulting from screening, from grinding, dusts from filters and mixtures thereof. Said "quick" calcium-magnesium compound may therefore be regarded as a calcium-magnesium component of the composition in the form of briquettes, which may contain other compounds.

In a particular embodiment of the invention, said pulverulent mixture comprises at most 97 wt %, preferably at most 90 wt %, preferably at most 88 wt %, in certain embodiments at most 60 wt % of CaO+MgO equivalent relative to the weight of said composition.

In one embodiment of the invention, a binder or a lubricant, more particularly selected from the group consisting of binders of mineral origin such as cements, days, silicates, binders of vegetable or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate and mixtures thereof, preferably calcium stearate and/or magnesium stearate, at a content between 0.1 and 1 wt %, preferably between 0-15 and 0.6 wt %, more preferably between 0.2 and 0.5 wt % relative to the total weight of the composition, may be added during mixing in the method according to the present invention.

The invention also relates to the use of a composition in the form of thermally treated briquettes according to the present invention in iron and steel metallurgy, in particular in oxygen converters or in arc furnaces.

More particularly, the thermally treated briquettes according to the present invention are used in oxygen converters or in arc furnaces, mixed with briquettes of "quick" calcium-magnesium compounds or with pebbles of "quick" calcium-magnesium compounds.

In fact, during the first minutes of the refining process, there is insufficient stag available in the reaction vessel for effective commencement of the reaction of dephosphorization in the methods of the prior art. The use of the composition according to the present invention. i.e. doped with flexes, which melts more quickly than limestone, helps to form a liquid slag earlier at the start of the process, in comparison with the conventional methods, owing to homogereous mixing and shaping of this homogenized mixture, which makes it possible to accelerate the slag forming process even more and minimize the formation of slag components of high melting point, such as the calcium silicates that usually form in the aforementioned method of the prior art.

The invention also relates to the use of a composition in the form of thermally treated briquettes in a process for refining molten metal, in particular for dephosphorization of molten metal and/or desulphurization of molten metal and/or reduction of loss of refined metal in the stag.

The use of a composition in the form of thermally treated briquettes according to the present invention in a process for refining molten metal comprises
- at least one step of introducing hot metal and optionally iron-based scrap in a vessel,
- at least one step of introducing a composition in the form of green briquettes or in the form of thermally treated briquettes according to the present invention,
- at least one step of blowing oxygen into said vessel,
- it least one step of forming a slag with said composition of briquettes in said vessel,
- at least one step of obtaining refined metal having a reduced content of phosphorus-containing and/or sulphur-containing compounds and/or an increased content of refined metal starting from hot metal by dephosphorization and/or desulphurization, and
- at least one step of discharging said refined metal having a reduced content of phosphorus containing and/or sulphur-containing components and/or increased content of refined metal.

The use according to the present invention further comprises potentially a step of adding quicklime, preferably quicklime in lumps or quicklime compacts, especially quicklime pellets or briquettes.

Other forms of use according to the invention are presented in the accompanying claims.

Other features, details and advantages of the invention will become clear from the description given hereunder, which is non-limiting and refers to the examples and to the figures.

Figure 1:
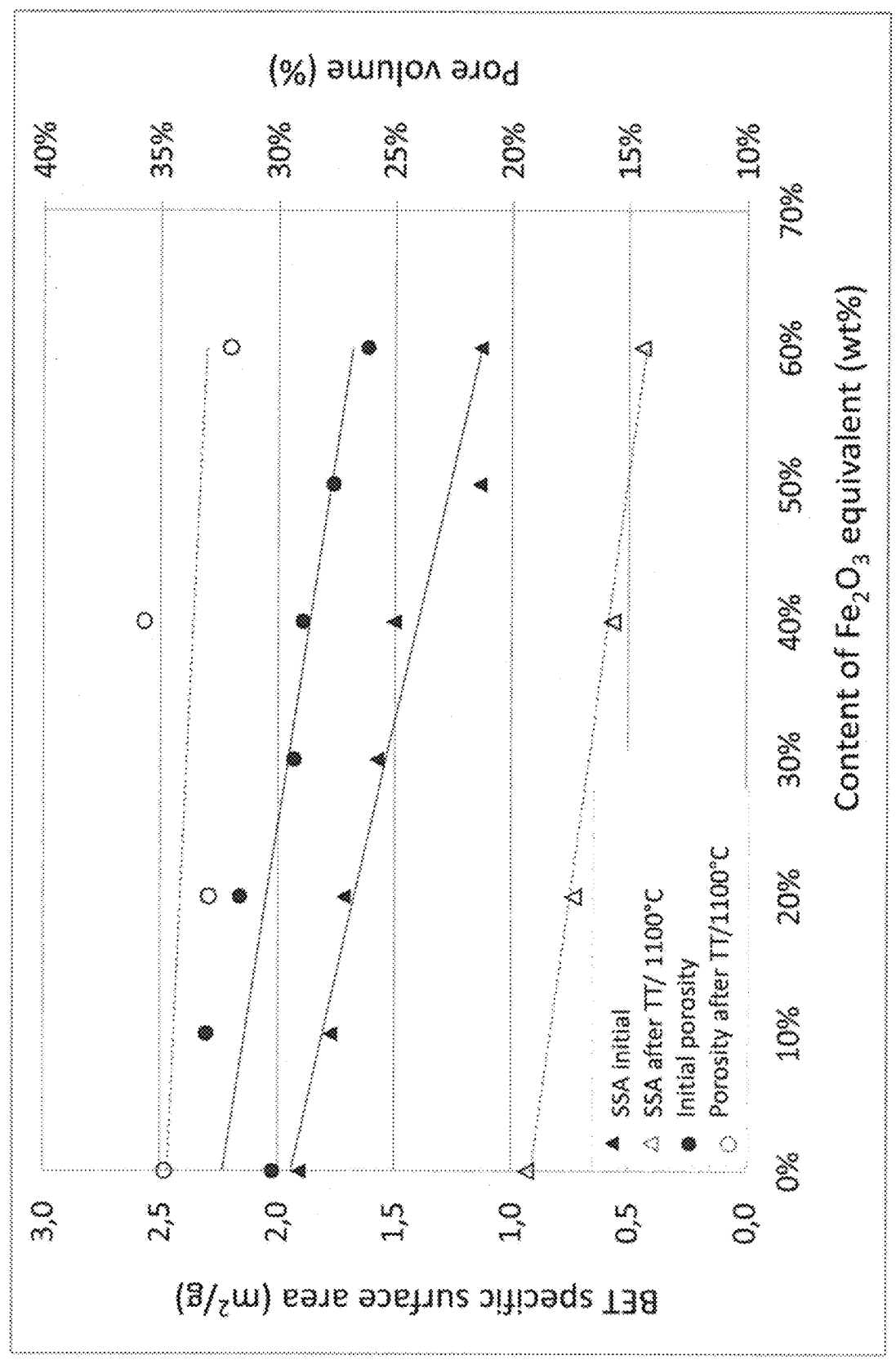
FIG. 1 is a graph of the BET specific surface area and of the BJH pore volume as a function of the content of $Fe_2O_3$ equivalent in the briquettes according to the present invention.

The present invention relates to a method for briquetting fine particles of calcium-magnesium compounds and iron based compound, said iron-based compound having a very fine granulomere distribution characterized by median size $d_{50}$ under 100 μm, preferably under 50 μm as well as a size $d_{90}$ under 200 μm, preferably under 150 μm, preferably under 130 μm, more preferably under 100 μm.

The method of briquetting according to the invention comprises supplying a pulverulent mixture comprising at least one "quick" calcium-magnesium compound, said mixture comprising at least 40 wt % of CaO+MgO equivalent relative to the weight of said composition and having a Ca/Mg molar ratio greater than or equal to 1, preferably greater than or equal to 2, more particularly greater than or equal to 3 and an iron-based compound having a very fine granulometric distribution characterized by a median size $d_{50}$ under 100 μm, preferably 50 μm as well as a size $d_{90}$ under 200 μm, preferably under 150 nm, preferably under 130 μm, more preferably under 100 μm; in which said "quick" calcium-magnesium compound comprising at least 40 wt % of CaO+MgO equivalent also comprises at least one fraction of particles of calcium-magnesium compound having a particle size ≤90 μm, which further comprises at least 20 wt % of CaO equivalent relative to the weight of said pulverulent mixture and in which said iron-based compound is present at a content of at least 20 wt %, preferably at least 25 wt %, more preferably at least 30 wt %, in particular at least 35 wt % relative to the total weight of said pulverulent mixture.

Advantageously, according to the present invention, said fraction of particles of calcium-magnesium compound having a particle size ≤90 μm contains at most 60 wt % of CaO equivalent relative to the weight of said pulverulent mixture.

According to the present invention, not only the formation of calcium ferrite is improved and gives a yield in conversion of iron oxide to calcium ferrite of about 90%, but also the balance between the formation of monocalcium ferrites and dicalcium ferrites can be controlled. In fact it has teen found to be beneficial, from an industrial standpoint, to be able to control the proportion of dicalcium ferrites relative to the proportion of monocalcium ferrites as necessary, and vice versa.

The approximately homogeneous mixture in which the iron-based compound is distributed homogeneously is fed to a roller press, sometimes also called a tangential press, for example a Komarek, Sahut Konreur, Hosokawa Bepex, or Kóppern press.

In the roller press, the homogeneous pulverulent mixture is compressed, optionally in the presence of a binder or a lubricant, more particularly selected from the group consisting of binders of mineral origin such as cements, clays, silicates, binders of vegetable or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate, and mixtures thereof, preferably calcium stearate and/or magnesium stearate, at a content between 0.1 and 1 wt %, preferably between 0.15 and 0.6 wt %, more preferably between 0.2 and 0.5 wt % relative to the total weight of said briquettes.

In use, the rollers of the roller press develop linear speeds at the periphery of the rollers between 10 and 100 cm/s, preferably between 20 and 80 cm/s, and linear pressures between 60 and 160 kN/cm, preferably between 80 and 140 kN/cm, and even more preferably between 80 and 120 kN/cm.

Assuming an angle of ½ degree at which the linear pressure is applied on the surface of the hoops, the surface pressure can be calculated, which is equal to the linear pressure divided by $(½,\pi,D)/360$, where D is the diameter of the hoops in cm. The surface pressure is between 300 and 500 MPa, preferably between 300 and 450 MPa, and more preferably between 350 and 450 MPa.

After compression, the calcium-magnesium composition is obtained in the form of green briquettes, which are collected.

In the method according to the present invention, the green briquettes collected are treated thermally at a temperature between 900° C. and 1200° C., preferably between 1050° C. and 1200° C. more preferably between 1100° C. and 1200° C. inclusive. The thermal treatment is preferably carried out for a predetermined time between 3 and 20 minutes, obtaining thermally treated briquettes in which said iron oxide has been converted to calcium ferrite and forms a matrix of calcium ferrite in which particles of calcium-magnesium compound are dispersed.

Said matrix is to be understood as being a continuous phase based on calcium ferrite in which particles of "quick" calcium-magnesium compound, in particular quicklime, are dispersed. A distinction is made between the case when said particles of "quick" calcium-magnesium compound are of small size so that they melt visibly in the matrix based on calcium ferrite, and the case when particles of "quick" calcium-magnesium compound are of larger size and appear as inclusions of "quick" calcium-magnesium compound in said matrix.

The aforesaid distinction is made concrete on the basis of a section of a briquette according to the invention, applying scanning electron microscopy coupled to energy dispersive analysis. This provides visualization in two dimensions (the surface of the section) of an object initially in three dimensions (briquette), but also of the particles that make up the briquette. Thus, the particles of calcium magnesium compound also appear in two dimensions on the section plane. As it is customary to liken particles in three dimensions to spheres and determine their size as the diameter of the equivalent sphere ("three-dimensional" size), in the present invention the cut surface of the particle is likened to an equivalent disk and its "two-dimensional" size to the equivalent diameter of this disk. More precisely, the two-dimensional sizes are calculated with a program that finds, for each particle of "quick" calcium-magnesium compound dispersed in the continuous matrix of calcium ferrite, the sum of the smallest and the largest dimension of its cut surface divided by two. This sum divided by two represents the diameter of the equivalent disk.

In this acceptation, it is considered that the panicles of "quick" calcium-magnesium compound melt or merge in said matrix (continuous phase) of calcium ferrite when said particles of "quick" calcium-magnesium compound have a two-dimensional size under 63 µm, observable by scanning electron microscopy coupled to energy dispersive analysis, in a section of the briquette.

In one embodiment of the invention, the thermal treatment of the green briquettes is carried out in a rotary kiln at high temperature, optionally equipped with a preheater.

Alternatively, the thermal treatment is carried out in a horizontal kiln, for example a tunnel kiln, a through-type kiln, a car-type kiln, a roller kiln or a mesh band kiln. As a variant, any other type of conventional kiln may be used, provided it does not cause a change in the integrity of the compacts, for example through excessive attrition.

Cooling may either be performed conventionally in the downstream part of the kiln, or outside the kiln, for example in a vertical cooler in countercurrent for the cooling air or else in a fluidized-bed cooler with cooling air in the case of tempering.

In a particular embodiment, cooling at the end of the thermal treatment is carried out quickly, in less than 15 min, preferably in less than 10 min, in a fluidized bed with cooling air.

Semi quantitative analysis of the iron-based compounds (iron oxides $Fe_2O_3$, $Fe_3O_4$, calcium ferrites $CaFe_2O_4$, $Ca_2Fe_2O_5$) is performed based on an X-ray diffraction pattern by the Rietveid method.

This method consists of simulating a diffraction pattern starting from a crystallographic model of the sample, then adjusting the parameters of this model so that the simulated diffraction pattern Is as close as possible to the experimental diffraction pattern. At the end of semi-quantitative analysis, it is verified that the total amount of iron expressed in $Fe_2O_3$ equivalent does not differ by more than 10% relative to the values obtained by XRF. The total percentage of iron in the form of calcium ferrites is obtained by simple division (Fe in the ferrites divided by Fe in the total of the iron-based compounds).

In an advantageous embodiment of the method according to the present invention, said pulverulent mixture further comprises less than 10% of particles of "quick" calcium-magnesium compound having a particle size ≥90 µm and ≤5 mm relative to the total weight of said pulverulent mixture.

Thus, the briquettes obtained by the method according to the present invention are of relatively homogeneous granulometry, i.e. the briquette, when it is cut open, has a granular composition in most of its volume. Thus, a continuous phase is observed, formed from calcium ferrite, calcium-magnesium compound, for example quicklime and optionally iron-based compound, such as iron oxide, depending on the green briquette's initial content of calcium-magnesium compound, of calcium component in the latter, and of iron-based compound.

In another advantageous embodiment of the method according to the present invention, said pulverulent mixture further comprises between 10% and 60% of particles of "quick" calcium-magnesium compound having a particle size ≤90 µm and ≤5 mm relative to the total weight of said pulverulent mixture.

An advantageous alternative according to the invention is to provide inclusions of "quick" calcium-magnesium compounds, in particular of quicklime, dispersed in the continuous phase (matrix) of calcium ferrite, as described above. In fact, the "quick" calcium-magnesium compound is then available in situ at the place where the calcium ferrites have promoted slag formation, acting as flux to allow the "quick" calcium-magnesium compound to act immediately.

In this advantageous embodiment of the method, it was found that on cutting open a thermally treated briquette obtained according to the present invention, the cut surface was strewn with inclusions of calcium-magnesium compound and/or quicklime, making the latter available in the form of unreacted quicklime for forming calcium ferrites and thus remaining available for use in the form of quicklime, for example in iron and steel metallurgy, for example for forming slag. The content of these inclusions of calcium-magnesium compound may vary, as indicated below in the section relating to the thermally treated briquettes according to the present invention.

More particularly, in the method according to the present invention, said at least one iron based compound is present at a content greater than or equal to 20 wt % relative to the total weight of said pulverulent mixture.

When the content of iron-based compound, more particularly of iron oxide with very fine granulomere distribution, is at least 20 wt % relative to the weight of the pulverulent mixture, but also when the level of CaO in the calcium-magnesium compound in the form of very fine particles ($d_{30}$ 21 90 µm) is at least 20 wt %, not only the formation of calcium ferrite is improved and gives a yield in conversion of iron oxide to calcium ferrite of about 90%, but also the equilibrium between the formation of monocalcium ferrites and dicalcium ferrites is oriented towards formation of dicalcium ferrites, particularly when the contents of CaO equivalent and very fine $Fe_2O_3$ are balanced. In fact it proved beneficial, from an industrial standpoint, to be able to control the proportion of dicalcium ferrites relative to the proportion of monocalcium ferrites as necessary, and vice versa.

In a preferred embodiment of the method according to the present invention, the percentage by weight of quicklime in the fraction of "quick" calcium-magnesium compound having a particle size <90 µm relative to the total of the percentage by weight of quicklime in the fraction of calcium-magnesium compound having a particle size <90 µm and the percentage of $Fe_2O_3$ equivalent in said iron-based compound with very fine granulomere distribution is ≥30%, preferably ≥32%, more preferably ≥34%, especially preferably ≥36%.

In fact it was found, advantageously, that it was possible to influence and control the proportion of monocalcium ferrite and dicalcium ferrite during calcination of the briquettes by adjusting the percentage by weight of CaO equivalent having a particle size <90 µm relative to the total of the percentage by weight of said particles of quicklime. When the percentage by weight of quicklime in the fraction of "quick" calcium-magnesium compound having a particle size <90 µm relative to the total of the percentage by weight of quicklime in the fraction of calcium-magnesium compound having a particle size <90 µm and the percentage of $Fe_2O_3$ equivalent of said iron-based compound with very fine granulomere distribution is ≥30%, preferably ≥32%, more preferably ≥34%, especially preferably ≥36%; calcination of the briquettes will rather promote the formation of dicalcium ferrite ($Ca_2Fe_2O_5$).

This means that if:

P1 represents the percentage, in the pulverulent mixture intended for briquetting, of the particles of the "quick" calcium-magnesium compound whose size is under 90 µm (fraction of calcium-magnesium compound having a particle size <90 µm), P2 represents the percentage, in the pulverulent mixture intended for briquetting, of the particles of the "quick" calcium-magnesium compound whose size is above 90 µm, P3: percentage of the iron-based compound (with very fine granulomere distribution) in the pulverulent mixture intended for briquetting, C1 represents the percentage of CaO equivalent in the particles of "quick" calcium-magnesium compound whose size is under 90 μm C2 represents the percentage of CaO equivalent in the particles of "quick" calcium-magnesium compound whose size is above 90 μm C3 represents the percentage of $Fe_2O_3$ equivalent in the iron-based compound (with very fine granulomere distribution)

The weight ratio "P1/(P1+P3)" is a key parameter that must be controlled for forming either predominantly monocalcium ferrites or predominantly dicalcium ferrites, and more generally the weight ratio "P1.C1/(P1.C1+P3.C3)" is one of the possibilities for predominant formation of monocalcium ferrite or else predominant formation of dicalcium ferrite.

In such an instance, said thermal treatment is preferably thermal treatment at a temperature less than or equal to 1150% preferably less than or equal to 1100° C., more particularly greater than or equal to 900° C., preferably according to the relation (predetermined time)/(temperature of thermal treatment −1000° C.)>5.

The percentage P2 is a key parameter that must be controlled for forming briquettes with or without inclusions of "quick" calcium-magnesium compound having a two-dimensional size above 63 μm.

In another embodiment, said iron-based compound comprises at least 50 wt %, preferably at least 60 wt %, more preferably at least 70 wt %, more preferably at least 80 wt % and in particular more than 95 wt % of iron oxide in the form of magnetite $Fe_3O_4$ relative to the total weight of the iron-based compound expressed in $Fe_2O_3$ equivalent.

In another preferred variant of the method according to the present invention, the percentage by weight of CaO equivalent having a particle size <90 μm relative to the total of the percentage by weight of CaO equivalent having a particle we <90 μm and of said iron-based compound is <40, preferably <38, more preferably <36% in order to influence the formation of monocalcium ferrites during calcination of the briquettes.

In such an instance, said thermal treatment is thermal treatment at a temperature less than or equal to 1150° C., preferably less than or equal to 1100° C. more particularly greater than or equal to 900° C., preferably according to the relation (predetermined time)/(temperature of thermal treatment −1000° C.) <5, which favours the formation of monocalcium ferrites even more.

More particularly, in this variant of the method according to the present invention, said iron-based compound comprises at least 50 wt %, preferably at least 60 wt %, more preferably at least 70 wt %, more preferably at least 80 wt %, and in particular more than 95 wt % of iron oxide in the form of haematite $Fe_2O_3$ relative to the total weight of the iron-based compound expressed in $Fe_2O_3$ equivalent.

At least 40%, preferably at least 50%, preferably at least 60% and more preferably at least 70% of the total iron is n the form of calcium ferrites.

Quantification of the calcium ferrites is performed by XRD/Rietveld analysts after grinding the briquettes, as for the green briquettes.

The thermally treated briquettes of the present invention have a shatter index ("STI", i.e. percentage by weight of fines below 10 mm after 4 drops from 2 m) below 6%, regardless of the content of iron-based compounds.

They are also characterized by a specific surface area greater than or equal to 0.4 $m^2/g$, preferably 0.5 $m^2/g$, preferably 0.6 $m^2/g$.

The porosity is greater than or equal to 20%, preferably 22%, preferably 24%.

The thermally treated briquettes have an apparent density between 2.0 and 3.0 and preferably between 2.2 and 2.8.

The thermally treated briquettes have good resistance to ageing. Thus, when they are exposed to a humid atmosphere containing for example 5 to 15 $g/m^3$ of absolute humidity, degradation of their mechanical properties (STI) only occurs beyond 4% of weight increase, preferably 4.5% of weight increase, and more preferably 5% of weight increase, following the reaction of hydration of quicklime CaO to slaked lime $Ca(OH)_2$.

EXAMPLES

Example 1.—Preparation of Quicklime Fines from Grinding and Pilot Preparation of the Briquettes The quicklime fines from grinding were prepared starting from a soft-burned lump lime produced in a parallel-flow regenerative kiln. Grinding is carried out in a hammer mill equipped with a 2-mm screen and a recycling loop for sizes above 2 mm. These quicklime fines from grinding contain 29% of particles with particle size under 90 μm ($d_{30}$<90 μm, 71% of particles above 90 μm, 37% of particles above 500 μm, 21% of particles above 1 mm and 1% of particles between 2 and 3 mm. The value of $t_{60}$ from the water reactivity test is 0.9 min. The BET specific surface area (measured by nitrogen adsorption manometry after vacuum degassing at 190° C. for at least two hours and calculated by the multi-point BET method as described in standard ISO 9277:2010E) is 1.7 $m^2/g$. These quicklime fines from grinding contain 95.7% of CaO and 0.8% of MgO by weight.

A Gericke GCM450 powder mixer is used, with a capacity of 10 $dm^3$, equipped with standard paddles with a radius of 7 cm, rotating at 350 revolutions per minute (i.e. 2.6 m/s). This mixer is used in continuous mode for preparing a mixture consisting of:
quicklime fines, optionally quicklime fines from grinding,
iron oxide fines,
powdered calcium stearate.

The total flow rate of the powder is 300 kg/h and the residence time is 3.5 s.

The mixture obtained is very homogeneous. This signifies that the Fe content for different 10-g samples taken from the final mixture is always within 5% of the average value.

A tangential press is used, equipped with hoops with a diameter of 604 mm and a width of 145 mm for producing briquettes with a theoretical volume of 7.2 $cm^3$ with the shape of a bar of soap (4 arrays of 67 pockets per hoop, i.e. 268 pockets per hoop), which can develop a linear pressure of up to 120 kN/cm.

Starting from 10 tonnes of the mixture, after feeding the tangential press, compaction is carried out at a speed of 12 revolutions per minute (or a linear speed of 38 cm/s) at a linear pressure of 120 kN/cm (or a calculated surface pressure of 455 MPa for an angle of 0.5 degree).

Some several tonnes of briquettes are obtained having an average volume of 8.4 $cm^3$, an average weight of 21.4 g and an average density of 2.4. These briquettes have a length of about 36 mm, a width of about 26 mm and a thickness of about 15.8 mm. These briquettes develop a total mercury pore volume (determined by mercury intrusion porosimetry according to part 1 of standard ISO 15901-1:2005E, which consists of dividing the difference between the skeletal density measured at 30000 psia, and the apparent density measured at 0.51 psia, by the skeletal density).

The water reactivity of the briquettes is determined by adding a predetermined amount of these briquettes, previously ground in the form of fines with a size between 0 and 1 mm, to 600 ml of water at 20° C., so as to correspond to 150 g of quicklime.

A shatter test is performed, starting from 10 kg of these briquettes, performing 4 successive drops from 2 m. The amount of fines under 10 mm generated at the end of these 4 drops is weighed.

The granulometric distribution of the iron-based particles in the composition in the form of briquette is determined by scanning electron microscopy and X-ray mapping, coupled to image analysts.

The briquettes are also characterized by performing thermal treatment (hot charge/discharge) on several of these briquettes, at the end of which a powder with granulometry below 80 μm is prepared. The latter is characterized by X-ray diffraction, and quantification of the phases is carried out by Rietveld analysis.

Examples 2 to 9

Green briquettes are prepared according to the invention with quicklime from grinding containing particles with sues between 0 and 2 mm, but having different granulometric profiles, and contents of iron oxide of the haematite type, expressed in $Fe_2O_3$ equivalent, ranging from 10% to 60%. The iron oxide used in these examples is characterized by a $d_{10}$ of 0.5 μm, $d_{50}$ of 12.3 μm and $d_{50}$ of 35.7 μm. In each example, the particles of quicklime from grinding with a size between 0 and 2 mm have at least 30% of particles that are under 90 μm. The protocol for preparation is described in example 1.

Green briquettes with the same composition were treated thermally at 1100° C. or 1200° C. for 20 minutes to obtain thermally treated briquettes having different contents of quicklime and iron-based compounds. The composition of the briquettes and the thermal treatment carried out are presented in Table 1, For these green and thermally treated briquettes, several tests were carried out, and are described below, referring to FIGS. 1 to 4.

FIG. 1 is a graph showing:
the variation of the BET specific surface area (SSA) as a function of the content of iron-based compound expressed in $Fe_2O_3$ equivalent, for green briquettes;
the variation of porosity as a function of the content of iron-based compound expressed in $Fe_2O_3$ equivalent, for green briquettes;
the variation of the BET specific surface area (SSA) as a function of the content of iron-based compound expressed in $Fe_2O_3$ equivalent, for thermally treated briquettes that have undergone thermal treatment (TT) of 1100° C. for 20 minutes; and
the variation of porosity as a function of the content of iron-based compound expressed in $Fe_2O_3$ equivalent, for thermally treated briquettes that have undergone thermal treatment (TTA) of 1100° C. for 20 minutes.

As can be seen, these variations of porosity and specific surface area show a slight linear decrease with the content of iron-based compound for the green and the thermally treated briquettes. The thermally treated briquettes have a lower specific surface area than that of the green briquettes, whereas they have higher porosity for identical contents of iron-based compound.

Figure 2:
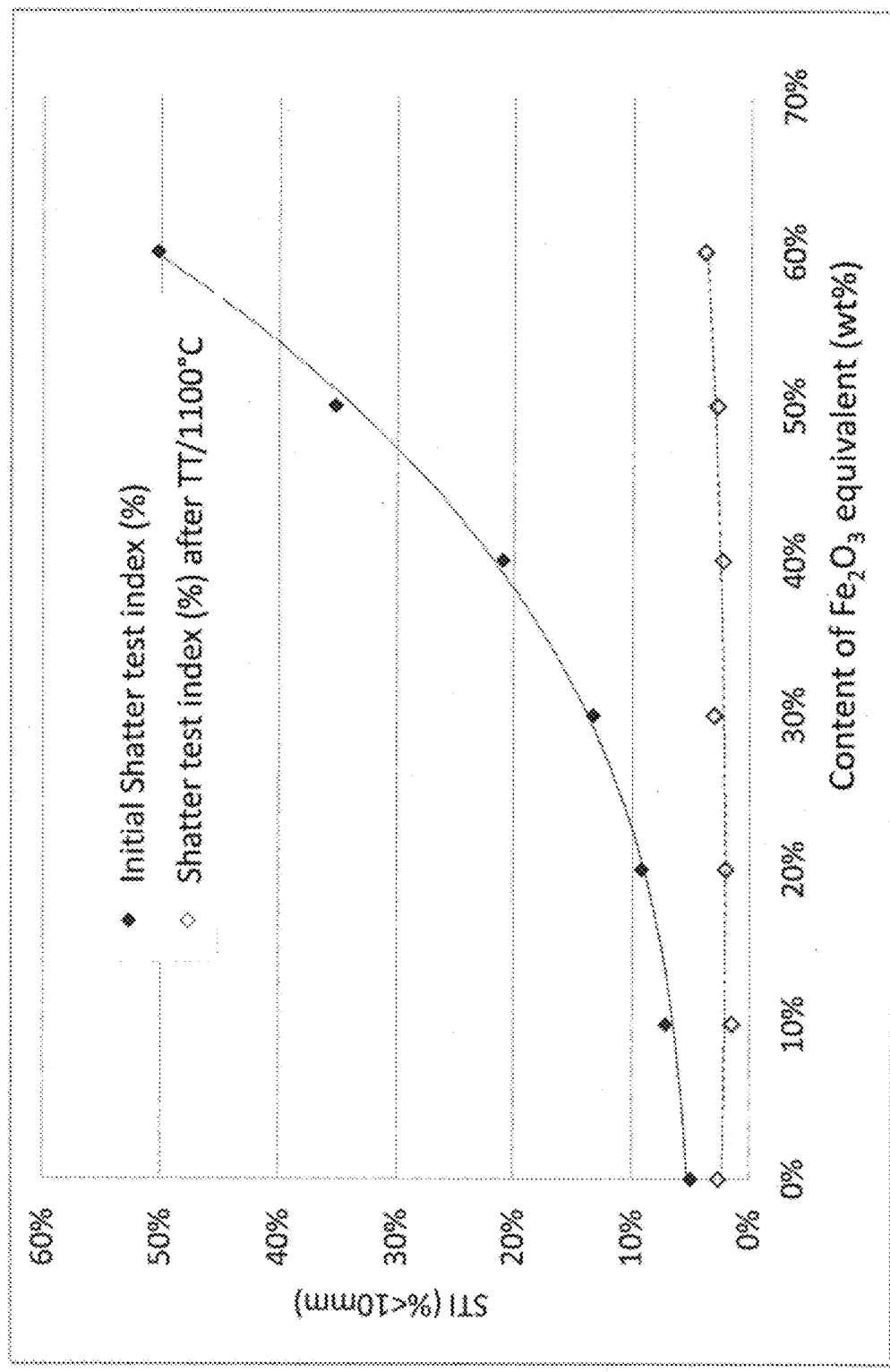
FIG. 2 is a graph of the shatter index (STI) as a function of the content of $Fe_2O_3$ equivalent in the thermally treated and green briquettes according to the present invention.

FIG. 2 is a graph showing:
the variation of the shatter index for green briquettes, as a function of the contents of iron-based compound expressed in $Fe_2O_3$ equivalent; and
the variation of the shatter index for thermally treated briquettes treated thermally at a temperature (TT) of 1100° C. for 20 minutes, as a function of the contents of iron-based compound expressed in $Fe_2O_3$ equivalent.

As can be seen, the shatter Indices are below 20% for green briquettes having contents of iron-based compound expressed in $Fe_2O_3$ equivalent below 40%, whereas for the thermally treated briquettes, all the shatter tests are below 10%, or even 6%.

Figure 3:
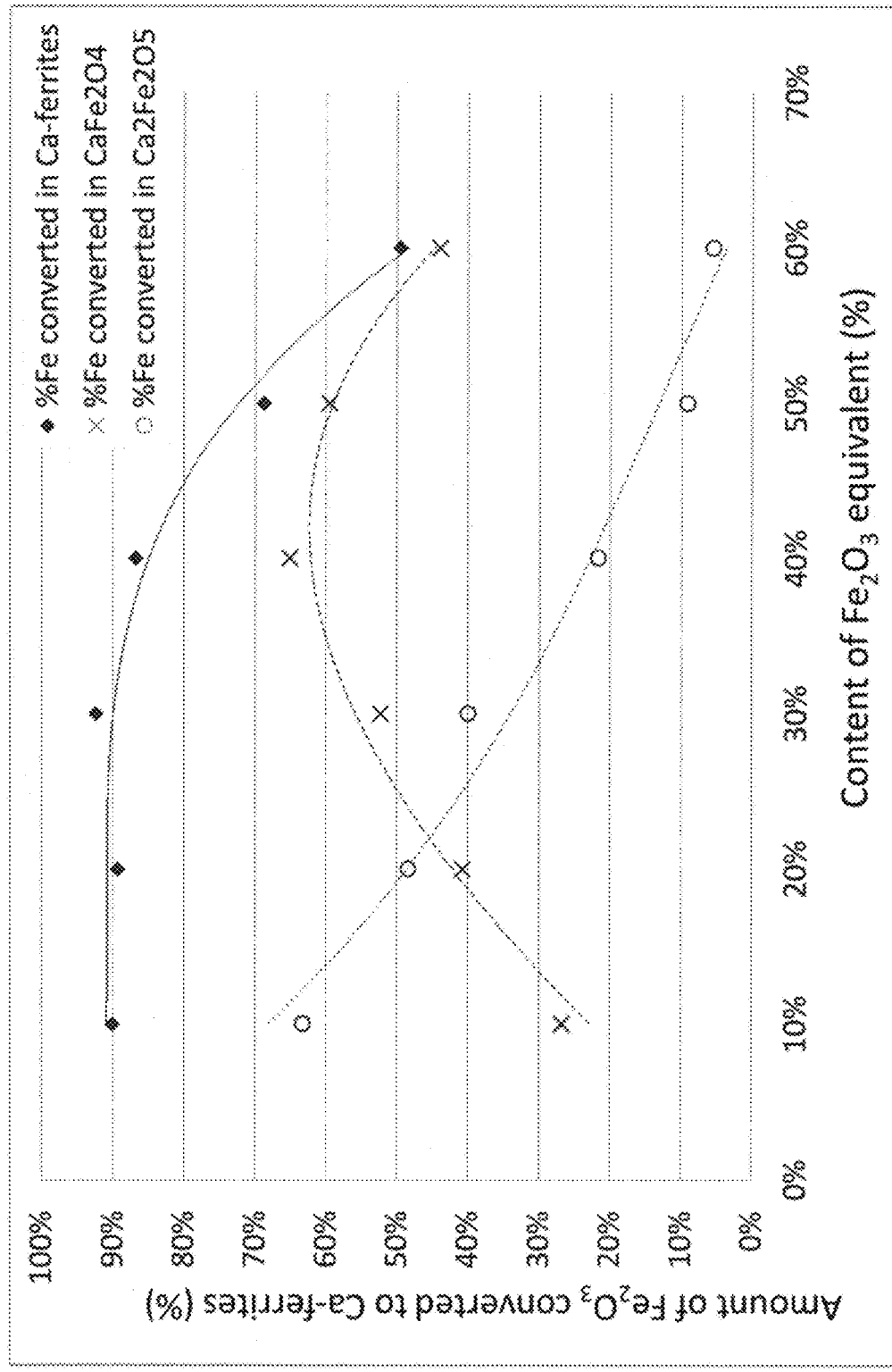
FIG. 3 is a graph of the percentage of $Fe_2O_3$ converted to calcium ferrites as a function of the content of $Fe_2O_3$ equivalent in the thermally treated briquettes according to the present invention.

FIG. 3 is a graph showing the variation of the yield of iron-based compound (iron oxide) converted to calcium ferrite, at a function of the iron oxide content expressed in $Fe_2O_3$ equivalent, as well as the amounts of iron oxide converted to monocalcium ferrite and dicalcium ferrite. The thermal treatment is carried out in a static bed for 20 min at 1100° C. in a tunnel kiln on 100 mm of thickness of briquettes.

As can be seen, the yield in conversion to calcium ferrite begins to decrease for contents of iron oxide expressed in $Fe_2O_3$ equivalent above 40%. The percentage of monocalcium ferrites passes through a maximum for contents of iron oxide of 40%. The percentage formation of dicalcium ferrites decreases with the iron oxide content.

Figure 4:
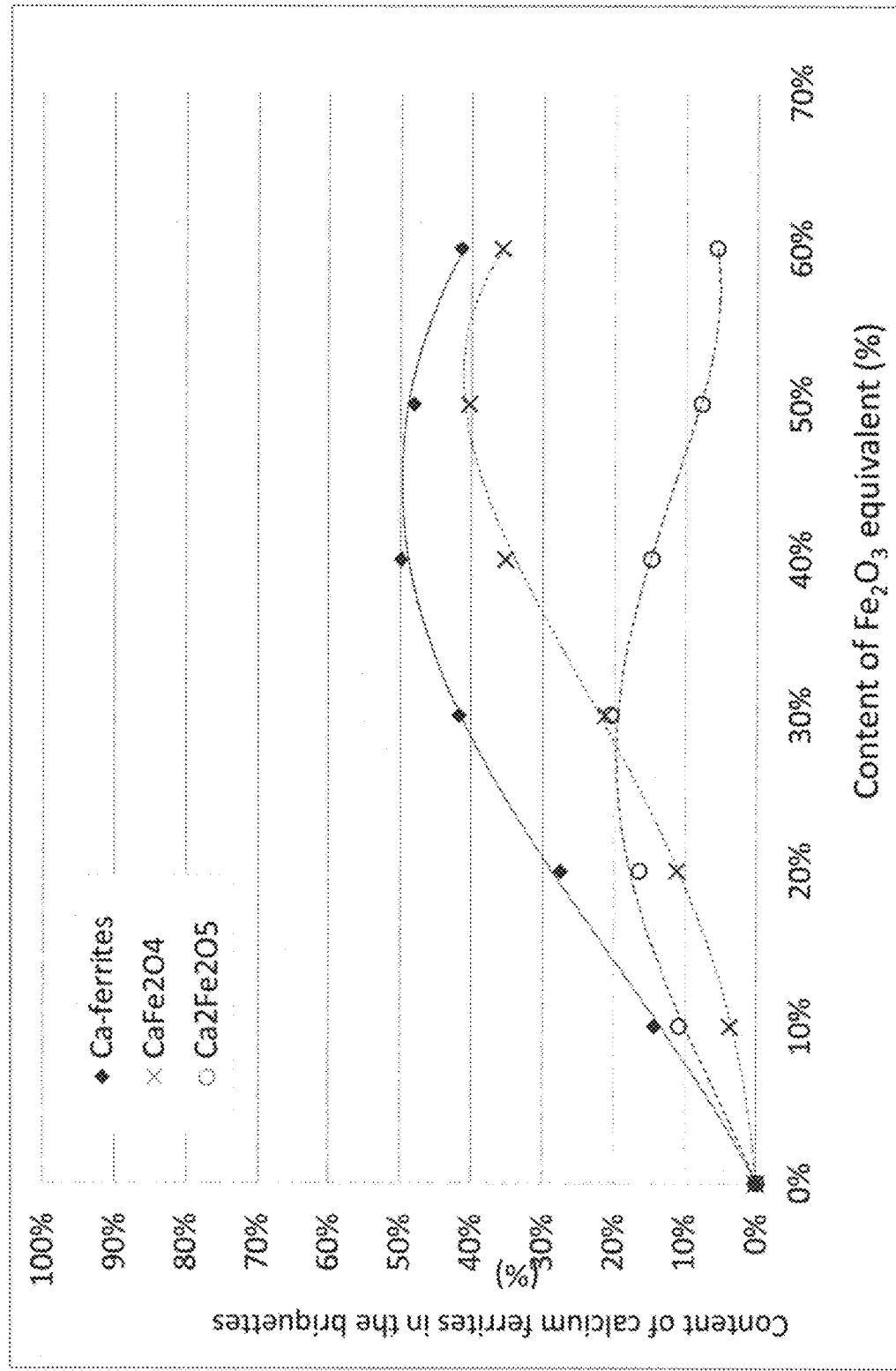
FIG. 4 is a graph of the percentage of $Fe_2O_3$ converted to calcium ferrites as a function of the content of $Fe_2O_3$ equivalent in the thermally treated briquettes according to the present invention.

FIG. 4 shows the variation of the content of calcium ferrites expressed in $Fe_2O_3$ equivalent in the thermally treated briquettes as a function of the iron oxide content expressed in $Fe_2O_3$ equivalent in the green briquettes before thermal treatment.

As can be seen, the contents of calcium ferrites in the thermally treated briquettes increase with the iron oxide content in the green briquettes. However, this variation passes through a maximum at 50% in content of calcium ferrites for contents of iron oxide in the green briquettes in the range between 40 and 45%, and then decreases at contents of calcium ferrites of about 40% for contents of iron oxide in the green briquettes of 60%.

It is nevertheless possible to push the yield in conversion of iron oxide to calcium ferrites beyond 90% and obtain contents of calcium ferrites in the thermally treated briquettes beyond 50%, even beyond 70% for example by increasing the temperature of the thermal treatment to 1200° C. or by optimizing the grinding of the quicklime so as to increase the proportion of quicklime particles under 90 μm, or a combination of the two. Several examples were carried out and measured, and are presented in Table 1.

TABLE 1

| Examples | % Fe$_2$O$_3$ equivalent | T° thermal treatment | Type of CaO | % conversion to calcium ferrites | % of calcium ferrites in the thermally treated briquette | % of CaFe$_2$O$_4$ by weight in calcium ferrites | % of Ca$_2$Fe$_2$O$_5$ by weight in calcium ferrites |
|---|---|---|---|---|---|---|---|
| Ex. 2 | 20% | 1200° C. | CaO <2 mm, with 30% <90 μm | 95% | 31% | 7 | 93 |
| Ex. 3 | 30% | 1200° C. | CaO <2 mm, with 30% <90 μm | 98% | 47% | 22.5 | 77.5 |
| Ex. 4 | 40% | 1200° C. | CaO <2 mm, with 30% <90 μm | 98% | 58% | 55.3 | 44.7 |
| Ex. 5 | 50% | 1200° C. | CaO <2 mm, with 30% <90 μm | 97% | 74% | 39.4 | 60.6 |
| Ex. 6 | 50% | 1100° C. | 50% of (CaO <2 mm, with 30% <90 μm) + 50% of CaO <90 μm | 90% | 65% | 69.9 | 30.1 |
| Ex. 7 | 50% | 1100° C. | 100% of CaO <90 μm | 96% | 73% | 47.2 | 52.8 |
| Ex. 8 | 50% | 1200° C. | 50% of (CaO <2 mm, with 30% <90 μm) + 50% of CaO <90 μm | 99% | 76% | 43.9 | 56.1 |
| Ex. 9 | 50% | 1100° C. | CaO <2 mm, with 30% <90 μm | 61% | 43% | 82.6 | 17.4 |

As can be seen in Table 1, it is possible to optimize the various parameters of percentage of iron oxide, temperature of the thermal treatment, granulometry of the quicklime, so as to obtain yields in conversion of iron oxide to calcium ferrite above 70%, preferably above 80%, more preferably above 90% with at least 40 wt % of calcium ferrites in the form of monocalcium ferrites.

In example 4, thermally treated briquettes having a yield in conversion to calcium ferrite of 98% and containing 55.3 wt % of monocalcium ferrite relative to the amount of calcium ferrites are produced after thermal treatment at 1200° C. for 20 minutes on green briquettes containing about 40 wt % of haematite and 60 wt % of quicklime having a d$_{97}$ equal to 2 mm and a d$_{30}$ equal to 90 μm (i.e. 30% of particles under 90 μm), except for the presence of 0.25 wt % of calcium stearate, relative to the total weight of the green briquettes.

In example 6, thermally treated briquettes having a yield in conversion to calcium ferrite of 90% and containing 69.9 wt % of monocalcium ferrite relative to the amount of calcium ferrites are produced after thermal treatment at 1100° C. for 20 minutes on green briquettes containing about 50 wt % of haematite and 25 wt % of quicklime having a d$_{100}$ equal to 2 mm and d$_{30}$ equal to 90 μm (i.e. 30% of particles under 90 μm) and 25 wt % of quicklime having a d$_{30}$ equal to 90 μm, except for the presence of 0.25 wt % of calcium stearate, relative to the total weight of the green briquettes.

In example 7, thermally treated briquettes having a yield in conversion to calcium ferrite of 96% and containing 47.2 wt % of monocalcium ferrite relative to the amount of calcium ferrites are produced after thermal treatment at 1100° C. for 20 minutes on green briquettes containing about 50 wt % of haematite and 50 wt % of quicklime having a d$_{100}$ equal to 90 μm. The yield of monocalcium ferrite can be increased by lowering the temperature of the thermal treatment to 1100° C., except for the presence of 0.25 wt % of calcium stearate, relative to the total weight of the green briquettes.

In example 8, thermally treated briquettes having a yield in conversion to calcium ferrite of 99% and containing 43.9 wt % of monocalcium ferrite relative to the amount of calcium ferrites are produced after thermal treatment at 1200° C. for 20 minutes on green briquettes containing about 50 wt % of haematite and 25 wt % of quicklime having a d$_{97}$ equal to 7 mm and a d$_{30}$ equal to 90 μm (i.e. 30% of particles under 90 μm) and 25 wt % of Quicklime having a d$_{97}$ equal to 90 μm, except for the presence of 0.25 wt % of calcium stearate, relative to the total weight of the green briquettes.

In example 9, thermally treated briquettes having a yield in conversion to calcium ferrite of 61% and containing 82.6 wt % of monocalcium ferrite relative to the amount of calcium ferrites are produced after thermal treatment at 1100° C. for 20 minutes on green briquettes containing about 50 wt % of haematite and 50 wt % of quicklime having a d$_{97}$ equal to 2 mm and a d$_{30}$ equal to 90 μm (i.e. 30% of particles under 90 μm). The yield of monocalcium ferrite ran be increased by increasing the amount by weight of quicklime having a d$_{100}$ equal to 90 μm, except for the presence of 0.25 wt % of calcium stearate, relative to the total weight of the green briquettes.

It may be advantageous in a metal refining process to have an amount of monocalcium fertile above 40 wt %, as monocalcium ferrite has a lower melting point than dicalcium ferrite, and this may accelerate dissolution of the briquettes in the slag.

It is also possible to optimize the various parameters of percentage of iron oxide, temperature of the thermal treatment granulometry of the quicklime, so as to obtain yields in conversion of iron oxide to calcium ferrite above 70%, preferably above 80%, more preferably above 90% with at least 40 wt % of calcium ferrites in the form of dicalcium ferrites. Although, as in example 7, it is possible to obtain, at 1100° C. for 20 minutes, 52.8% of dicalcium ferrites relative to the amount of calcium ferrites, most of the other examples show that the formation of at least 40% of dicalcium ferrites relative to the amount of calcium ferrites is promoted when the briquettes are submitted to a thermal treatment of 1200° C. for 20 minutes.

It may be advantageous to optimize the process parameters so as to obtain at least 40% of dicalcium ferrites relative to the amount by weight of calcium ferrites, in order to obtain a larger amount of dicalcium ferrites with a higher melting point relative to the melting point of monocalcium ferrite and thus minimize the risk of melting of the briquettes in the furnace.

Figure 5:
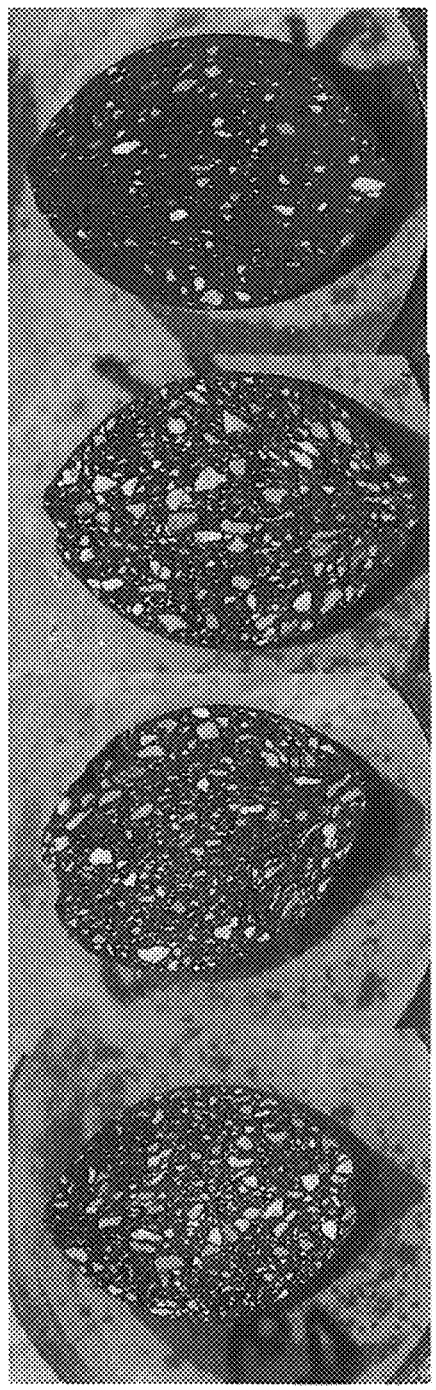
FIG. 5 shows photographs of sections of different briquettes of compositions according to the present invention.
Figure 5:

FIG. 5 shows photographs of the sections of the briquettes from examples 2 to 9. The textures of the thermally treated briquettes from examples 2 to 9 were analysed by scanning electron microscopy coupled to energy dispersive analysis, by preparing a section of these briquettes, by encapsulating these briquettes in a resin, and by polishing the surface of the section. These analyses make it possible to construct a map of the distribution of each element in a section of the briquettes. Using image analysis software, it is possible to combine the maps obtained for each element and measure the size distribution and the relative coverage of each element.

It has thus been shown for the briquettes from examples 2 to 9 that calcium ferrite forms a matrix (or continuous phase) in which particles of quicklime (discontinuous phase) are dispersed. A calcium ferrite matrix can be obtained after thermal treatment for 20 minutes at temperatures between 900° C. and 1200° C., preferably between 1050 and 1200° C., of green briquettes containing at least 20 wt % of particles of calcium-magnesium compound, preferably in the form of quicklime and at least 20 wt % of iron oxide having a $d_{90}$ under 200 µm, preferably under 150 µm, more preferably under 100 µm and a $d_{50}$ below 50. The two-dimensional sizes of the particles of lime dispersed in the matrix are calculated by a program that finds the average of the smallest and largest dimension of each particle of quicklime in the calcium ferrite matrix. The particles are classified in a first group of particles whose two-dimensional size is under 63 µm and above the limit of detection of the measuring equipment, and a second group of particles whose two-dimensional size is above 63 µm. Table 2 below shows, for the briquettes from examples 2 to 9, the relative coverage of the calcium ferrite matrix, of the particles of quicklime under 63 µm and of the particles of quicklime above 63 µm in the cut section from each briquette.

TABLE 2

|  | Ex 2 | Ex 3 | Ex 4 | Ex 5 | Ex 6 | Ex 7 | Ex 8 | Ex 9 |
| --- | --- | --- | --- | --- | --- | --- | --- | --- |
| Matrix (% surface coverage) | 41 | 50 | 52 | 72 | 70 | 83 | 80 | 54 |
| CaO <63 µm (% surface coverage) | 2 | 3 | 2 | 4 | 8 | 11 | 4 | 4 |
| CaO >63 µm (% surface coverage) | 56 | 47 | 46 | 24 | 22 | 6 | 17 | 42 |

The percentages of surface coverage of the particles of quicklime above 63 µm are less than 25% for thermally treated briquettes having contents of calcium ferrites above 60 wt % of the composition.

Example 10

Green briquettes were prepared with 38.85 wt % of iron oxide in the form of magnetite $Fe_3O_4$ having a $d_{97}$ of 150 µm and with 60.9 wt % of quicklime having a $d_{97}$ below 2 mm and a $d_{30}$ below 90 µm as well as 0.25 wt % of calcium stearate, relative to the weight of the briquette. Thermal treatment was carried out on a static bed of three layers of briquettes for 20 mm at 1100° C. in order to obtain thermally treated briquettes and the percentage by weight of iron converted to monocalcium ferrite is 8% whereas the percentage of iron converted to dicalcium ferrite is 82%.

Example 11

Green briquettes were prepared with 39.9 wt % of iron oxide in the form of haematite $Fe_2O_3$ characterized by a $d_{10}$ of 0.5 µm, $d_{50}$ of 12.3 µm and $d_{90}$ of 35.7 µm and with 59.85 wt % of quicklime having a $d_{97}$ below 2 mm and a $d_{30}$ below 90 µm and 0.25 wt % of calcium stearate relative to the weight of the briquette. The green briquettes obtained were treated thermally in the same conditions as in example 17 in order to obtain thermally treated briquettes, in this case, the percentage of iron converted to monocalcium ferrite is 65 wt % and the percentage of iron converted to dicalcium ferrite is 24 wt %.

Examples 12 to 28.—Protreatment Under Modified Atmosphere Containing $CO_2$ Corresponding Respectively to Tests 1 to 17 in Table 3

In the following examples, compressive strength tests were performed on the briquettes using a Pharmatron Multitest 50, one of the plates of which is equipped with a point. The presence of a point reduces the force necessary to cause rupture of the briquettes relative to a compressive strength test carried out without the point.

10 green briquettes containing 59.85 wt % of quicklime similar to that used in example 1, 39.9% of $Fe_2O_3$ from example 11 and 0.25% of calcium stearate were characterized by this compressive strength test. The average value is 33 kg-force.

Several ore-treatment tests were carried out, varying the parameters as indicated in Table 4, each time charging 10 new green briquettes in an 11-litre electric muffle furnace. All these pre-treatments were carried out between 20 and 450° C. under a flow of 10 litres per minute of a gas mixture formed from $N_2$, $H_2O$ and $CO_2$. The ramps of temperature rise are between 2 and 10° C./min.

The concentrations by volume of $H_2O$ in the gas are between 3.9 and 20.1%. The concentrations by volume of $CO_2$ in the gas are between 0.9 and 9.1%.

At the end of the pre-treatment, for each test, the 10 briquettes were characterized by compressive strength testing. In addition, all 10 pre-treated briquettes were analysed to determine the weight gains relating to hydration $dm(H_2O)/m$ and to carbonation $dm(CO_2)/m$. All of the results are presented in Table 3.

As can be seen, beyond 2 vol % of $CO_2$ in the gas forming the modified atmosphere, the pre-treatment leads to consolidation of the briquettes. Conversely, below 2 vol % of $CO_2$, the briquettes become less cohesive.

TABLE 3

| | Thermal Pre-Treatment | | | (Characterization of the thermally pre-treated briquettes) | | | |
| --- | --- | --- | --- | --- | --- | --- | --- |
| | T(° C/min) | H2O (% vol) | CO2 (% vol) | dm(CO2)/ m(%) | dm (H20)/ m (%) | Crush test (kg-force) | Variation in crush test (%) |
| Essai 1 | 3.0 | 6.0 | 2.0 | 0.74 | 0.73 | 55 | 67% |
| Essai 2 | 9.0 | 6.0 | 2.0 | 0.43 | 0.44 | 50 | 52% |
| Essai 3 | 3.0 | 18.0 | 2.0 | 0.95 | 1.67 | 43 | 29% |
| Essai 4 | 9.0 | 18.0 | 2.0 | 0.42 | 1.03 | 33 | −1% |
| Essai 5 | 3.0 | 6.0 | 8.0 | 2.23 | 0.20 | 60 | 82% |
| Essai 6 | 9.0 | 6.0 | 8.0 | 1.26 | 0.24 | 49 | 48% |

TABLE 3-continued

| | Thermal Pre-Treatment | | | (Characterization of the thermally pre-treated briquettes) | | | |
|---|---|---|---|---|---|---|---|
| | T(° C/ min) | H2O (% vol) | CO2 (% vol) | dm(CO2)/ m(%) | dm (H20)/ m (%) | Crush test (kg-force) | Variation in crush test (%) |
| Essai 7 | 3.0 | 18.0 | 8.0 | 2.51 | 0.90 | 51 | 55% |
| Essai 8 | 9.0 | 18.0 | 8.0 | 1.08 | 0.87 | 44 | 33% |
| Essai 9 | 1.9 | 12.0 | 5.0 | 3.29 | 0.59 | 60 | 83% |
| Essai 10 | 10.1 | 12.0 | 5.0 | 0.77 | 0.69 | 46 | 40% |
| Essai 11 | 6.0 | 3.9 | 5.0 | 1.08 | 0.24 | 49 | 47% |
| Essai 12 | 6.0 | 20.1 | 5.0 | 1.21 | 1.07 | 49 | 49% |
| Essai 13 | 6.0 | 12.0 | 0.9 | 0.13 | 1.32 | 9 | −74% |
| Essai 14 | 6.0 | 12.0 | 9.1 | 1.82 | 0.46 | 60 | 81% |
| Essai 15 | 6.0 | 12.0 | 5.0 | 1.03 | 0.64 | 45 | 36% |
| Essai 16 | 6.0 | 12.0 | 5.0 | 1.11 | 0.51 | 49 | 48% |
| Essai 17 | 6.0 | 12.0 | 5.0 | 1.25 | 0.68 | 57 | 74% |

Legend:
Essai = test

Comparative Example 4

The shatter indices were compared with the compressive force for several samples of green briquettes to establish the correlation between the shatter index and the compressive force. The green briquettes tested comprised quicklime with particle sire between 0 and 3 mm with different contexts of iron oxide, from 0 to 60 wt % and different contents of lubricant, ranging from 0.125 to 0.5 wt %, relative to the total weight of the briquettes. The parameters of the briquetting process were also altered to ensure that the population was large enough for establishing the correlation.

A compressive force of greater than 144 kg, corresponding to 317.5 pounds, is required for briquettes having a shatter index below 10%.

Of course, the present invention is not in any way limited to the embodiments described above, and a great many modifications may be made to it while remaining within the scope of the appended claims.

The invention claimed is:

1. Composition in the form of thermally treated briquettes comprising a "quick" calcium-magnesium compound selected from the group consisting of quicklime, magnesian quicklime, dolomitic quicklime and quick calcined dolomite, and an iron-based compound in the form of calcium ferrite, characterized in that said calcium ferrite forms a matrix, the matrix being a continuous phase of calcium ferrite in which particles of said "quick" calcium-magnesium compound are dispersed.

2. Composition in the form of thermally treated briquettes according to claim 1, characterized in that, said particles of "quick" calcium-magnesium compound have a two-dimensional size under 63 µm, observable by scanning electron microscopy coupled to energy dispersive analysis, in a section of said thermally treated briquette.

3. Composition in the form of thermally treated briquettes according to claim 1, characterized in that it further comprises particles of "quick" calcium-magnesium compound of two-dimensional size above 63 µm and under 5 mm, observable by scanning electron microscopy coupled to energy dispersive analysis, in a section of said thermally treated briquette.

4. Composition in the form of thermally treated briquettes according to claim 3, in which said particles of "quick" calcium-magnesium compound of two-dimensional size above 63 µm and under 5 mm, observable by scanning electron microscopy coupled to energy dispersive analysis, in a section of said thermally treated briquette cover at least 20% of the area of said section.

5. Composition in the form of thermally treated briquettes according to claim 3, in which said particles of "quick" calcium-magnesium compound of two-dimensional size above 63 µm and under 5 mm, observable by scanning electron microscopy coupled to energy dispersive analysis, in a section of said thermally treated briquette cover at most 60% of the surface area of said section.

6. Composition in the form of thermally treated briquettes according to claim 1, in which at least 70 wt % of said iron-based compound is in the form of calcium ferrites.

7. Composition in the form of thermally treated briquettes according to claim 1, characterized in that at least 40 wt % of said calcium ferrites are in the form of monocalcium ferrite $Ca_2Fe_2O_4$.

8. Composition in the form of thermally treated briquettes according to claim 1, characterized in that at least 40 wt % of said calcium ferrites are in the form of dicalcium ferrite $Ca_2Fe_2O_5$.

9. Composition in the form of thermally treated briquettes according to claim 1, characterized in that it has a BET specific surface area greater than or equal to 0.4 $m^2/g$.

10. Composition in the form of thermally treated briquettes according to claim 1, characterized in that it has porosity greater than or equal to 20%.

11. Composition in the form of thermally treated briquettes according to claim 1, characterized in this said thermally treated briquettes have a shatter test index below 10%, said shatter test index being the percentage by weight of fines wider 10 mm generated after 4 drops from 2 m starting from 10 kg of product, the fines being quantified by sieving through a screen with square mesh of 10 mm after 4 drops from 2 m.

12. Composition in the form of thermally treated briquettes according to claim 1, wherein said quick calcium-magnesium compound is quicklime.

13. Composition in the form of thermally treated briquettes made by baking green briquettes at a temperature between 1050° C. and 1200° C. for a time between 5 and 25 minutes, comprising a "quick" calcium-magnesium compound selected from the group consisting of quicklime, magnesian quicklime, dolomitic quicklime and quick calcined dolomite, and an iron-based compound in the form of calcium ferrite, characterized in that said calcium ferrite forms a matrix, the matrix being a continuous phase of calcium ferrite in which particles of said "quick" calcium-magnesium compound are dispersed.

* * * * *